US010783394B2

(12) United States Patent
Molchanov et al.

(10) Patent No.: US 10,783,394 B2
(45) Date of Patent: *Sep. 22, 2020

(54) EQUIVARIANT LANDMARK TRANSFORMATION FOR LANDMARK LOCALIZATION

(71) Applicant: NVIDIA Corporation, Santa Clara, CA (US)

(72) Inventors: Pavlo Molchanov, San Jose, CA (US); Stephen Walter Tyree, St. Louis, MO (US); Jan Kautz, Lexington, MA (US); Sina Honari, Hampstead (CA)

(73) Assignee: NVIDIA Corporation, Santa Clara, CA (US)

( * ) Notice: Subject to any disclaimer, the term of this patent is extended or adjusted under 35 U.S.C. 154(b) by 253 days.

This patent is subject to a terminal disclaimer.

(21) Appl. No.: 16/006,728

(22) Filed: Jun. 12, 2018

(65) Prior Publication Data

US 2018/0365512 A1    Dec. 20, 2018

Related U.S. Application Data

(60) Provisional application No. 62/522,520, filed on Jun. 20, 2017.

(51) Int. Cl.
*G06K 9/00* (2006.01)
*G06K 9/62* (2006.01)
(Continued)

(52) U.S. Cl.
CPC ........... *G06K 9/46* (2013.01); *G06K 9/00234* (2013.01); *G06K 9/00248* (2013.01);
(Continued)

(58) Field of Classification Search
USPC ................................ 382/156, 118, 128, 195
See application file for complete search history.

(56) References Cited

U.S. PATENT DOCUMENTS

| 5,850,470 A | 12/1998 | Kung et al. |
| 6,038,337 A | 3/2000 | Lawrence et al. |

(Continued)

FOREIGN PATENT DOCUMENTS

| CN | 103824049 A | 5/2014 |
| CN | 103824054 A | 5/2014 |

(Continued)

OTHER PUBLICATIONS

Wei et al., "HCP: A Flexible CNN Framework for Multi-label Image Classification," IEEE Transactions on Pattern Analysis and Machine Intelligence, 2015, pp. 1-8.

(Continued)

*Primary Examiner* — Kathleen Y Dulaney
(74) *Attorney, Agent, or Firm* — Leydig, Voit & Mayer, Ltd.

(57) ABSTRACT

A method, computer readable medium, and system are disclosed to generate coordinates of landmarks within images. The landmark locations may be identified on an image of a human face and used for emotion recognition, face identity verification, eye gaze tracking, pose estimation, etc. A transform is applied to input image data to produce transformed input image data. The transform is also applied to predicted coordinates for landmarks of the input image data to produce transformed predicted coordinates. A neural network model processes the transformed input image data to generate additional landmarks of the transformed input image data and additional predicted coordinates for each one of the additional landmarks. Parameters of the neural network model are updated to reduce differences between the transformed predicted coordinates and the additional predicted coordinates.

18 Claims, 18 Drawing Sheets

(51) Int. Cl.
  *G06K 9/46* (2006.01)
  *G06N 3/08* (2006.01)
  *G06K 9/66* (2006.01)
  *G06N 3/04* (2006.01)

(52) U.S. Cl.
  CPC ..... *G06K 9/00281* (2013.01); *G06K 9/00302* (2013.01); *G06K 9/4628* (2013.01); *G06K 9/6256* (2013.01); *G06K 9/6279* (2013.01); *G06K 9/66* (2013.01); *G06N 3/0454* (2013.01); *G06N 3/08* (2013.01); *G06N 3/084* (2013.01); *G06N 3/088* (2013.01); *G06N 3/0445* (2013.01)

(56) References Cited

U.S. PATENT DOCUMENTS

| | | | |
|---|---|---|---|
| 6,128,398 A * | 10/2000 | Kuperstein | G06K 9/00288 382/118 |
| 6,208,758 B1 | 3/2001 | Ono et al. | |
| 8,396,531 B2 * | 3/2013 | Zhou | A61B 5/1075 345/419 |
| 8,401,308 B2 * | 3/2013 | Nakamura | G06K 9/4642 382/203 |
| 9,396,415 B2 | 7/2016 | Chertok et al. | |
| 9,400,918 B2 | 7/2016 | Yin et al. | |
| 9,400,922 B2 * | 7/2016 | Zhou | G06K 9/4628 |
| 9,400,925 B2 | 7/2016 | Bourdev | |
| 9,530,071 B2 | 12/2016 | Yin et al. | |
| 9,552,549 B1 | 1/2017 | Gong et al. | |
| 9,665,802 B2 | 5/2017 | Wang et al. | |
| 9,697,444 B2 | 7/2017 | Wu et al. | |
| 9,760,807 B2 | 9/2017 | Zhou et al. | |
| 9,798,956 B2 | 10/2017 | Jiang et al. | |
| 10,262,214 B1 | 4/2019 | Kim et al. | |
| 10,552,709 B2 | 2/2020 | Fua et al. | |
| 2005/0018925 A1 * | 1/2005 | Bhagavatula | G06K 9/746 382/278 |
| 2005/0147292 A1 * | 7/2005 | Huang | G06K 9/00228 382/159 |
| 2005/0185835 A1 | 8/2005 | Matsugu et al. | |
| 2007/0009155 A1 * | 1/2007 | Potts | G06K 9/00 382/182 |
| 2012/0093397 A1 * | 4/2012 | Wang | G06K 9/6257 382/159 |
| 2014/0147022 A1 * | 5/2014 | Zhou | G06K 9/00281 382/118 |
| 2015/0112182 A1 * | 4/2015 | Sharma | A61B 5/7282 600/408 |
| 2015/0154229 A1 | 6/2015 | An et al. | |
| 2015/0238148 A1 * | 8/2015 | Georgescu | G06K 9/4628 600/408 |
| 2015/0254532 A1 | 9/2015 | Talathi et al. | |
| 2016/0055237 A1 * | 2/2016 | Tuzel | G06K 9/6282 382/224 |
| 2016/0140436 A1 | 5/2016 | Yin et al. | |
| 2016/0174902 A1 * | 6/2016 | Georgescu | A61B 5/7267 600/408 |
| 2016/0189009 A1 | 6/2016 | Tran et al. | |
| 2016/0307070 A1 * | 10/2016 | Jiang | G06K 9/6262 |
| 2016/0358038 A1 * | 12/2016 | Jaderberg | G06N 3/0454 |
| 2016/0379041 A1 | 12/2016 | Rhee et al. | |
| 2016/0379044 A1 | 12/2016 | Tang et al. | |
| 2017/0004619 A1 * | 1/2017 | Liang | A61B 6/032 |
| 2017/0061246 A1 * | 3/2017 | Chen | G06K 9/6232 |
| 2017/0061249 A1 * | 3/2017 | Estrada | G06T 5/005 |
| 2017/0083751 A1 | 3/2017 | Tuzel et al. | |
| 2017/0083796 A1 | 3/2017 | Kim et al. | |
| 2017/0124433 A1 * | 5/2017 | Chandraker | G06T 7/337 |
| 2017/0168586 A1 | 6/2017 | Sinha et al. | |
| 2017/0262733 A1 | 9/2017 | Gulsun et al. | |
| 2017/0337470 A1 * | 11/2017 | DeTone | G06K 9/46 |
| 2018/0032846 A1 | 2/2018 | Yang et al. | |
| 2018/0060701 A1 * | 3/2018 | Krishnamurthy | G06K 9/6256 |
| 2018/0061046 A1 | 3/2018 | Bozorgtabar et al. | |
| 2018/0061059 A1 | 3/2018 | Xu et al. | |
| 2018/0122098 A1 | 5/2018 | Wang et al. | |
| 2018/0165543 A1 | 6/2018 | Mody et al. | |
| 2018/0174022 A1 | 6/2018 | Young | |
| 2018/0189325 A1 | 7/2018 | Hohwald et al. | |
| 2018/0247405 A1 | 8/2018 | Kisilev et al. | |
| 2018/0341872 A1 * | 11/2018 | Wang | G06T 7/11 |
| 2018/0365824 A1 | 12/2018 | Yuh et al. | |
| 2018/0374213 A1 | 12/2018 | Arnold et al. | |
| 2019/0258917 A1 | 8/2019 | Chai et al. | |

FOREIGN PATENT DOCUMENTS

| | | |
|---|---|---|
| CN | 105426919 A | 3/2016 |
| CN | 107330954 A | 11/2017 |
| CN | 107633255 A | 1/2018 |
| CN | 107729805 A | 2/2018 |
| EP | 2869239 A2 | 5/2015 |
| WO | 2016090522 A1 | 6/2016 |
| WO | 2017029488 A2 | 2/2017 |

OTHER PUBLICATIONS

Song et al., "Robust 3D Face Landmark Localization Based on Local Coordinate Coding," IEEE Transactions on Image Processing, vol. 23, No. 12, Dec. 2014, pp. 5108-5122.

Li et al., "DeepSaliency: Multi-Task Deep Neural Network Model for Salient Object Detection," IEEE Transactions on Image Processing, 2016, pp. 1-12.

Honari et al., "Recombinator Networks: Learning Coarse-to-Fine Feature Aggregation," Proceedings of the IEEE Conference on Computer Vision and Pattern Recognition, 2016, pp. 5743-5752.

Laine et al., "Temporal Ensembling for Semi-Supervised Learning," International Conference on Learning Representation, 2017, pp. 1-13.

Zhang et al., "Facial Landmark Detection by Deep Multi-task Learning," ECCV, 2014, 15 pages retrieved from http://personal.ie.cuhk.edu.hk/~ccloy/files/eccv_2014_deepfacealign.pdf.

Zhang et al., "Learning Deep Representation for Face Alignment with Auxiliary Attributes," IEEE Transactions on Pattern Analysis and Machine Intelligence, 2015, pp. 1-14.

Devries et al., "Multi-Task Learning of Facial Landmarks and Expression," CRV, IEEE, 2014, 6 pages.

Zhang et al., "Improving Multiview Face Detection with Multi-task Deep Convolutional Neural Networks," IEEE Winter Conference on Applications of Computer Vision, Mar. 2014, pp. 1036-1041.

Molchanov et al., U.S. Appl. No. 16/006,709, filed Jun. 12, 2018.

Hu et al., "Hand Pointing Estimation for Human Computer Interaction Based on Two Orthogonal-Views," International Conference on Pattern Recognition, 2010, pp. 3760-3763.

Kahou et al., "Combining Modality Specific Deep Neural Networks for Emotion Recognition in Video," 15th ACM International conference on Multimodal Interaction, 2013, 8 pages.

Kawulok et al., "Self-adaptive algorithm for segmenting skin regions," EURASIP, Journal on Advances in Signal Processing, 2014, pp. 1-22.

Koestinger et al., "Annotated Facial Landmarks in the Wild: A Large-scale, Real-world Database for Facial Landmark Localization," IEEE International Workshop on Benchmarking Facial Image Analysis Technologies, 2011, 9 pages.

Long et al., "Fully Convolutional Networks for Semantic Segmentation," Proceedings of the IEEE Conference on Computer Vision and Pattern Recognition, 2015, pp. 1-10.

Martinez et al., "Local Evidence Aggregation for Regression Based Facial Point Detection," IEEE Transactions on Pattern Analysis and Machine Intelligence, 2013, 15 pages.

Ranjan et al., "HyperFace: A Deep Multi-task Learning Framework for Face Detection, Landmark Localization, Pose Estimation, and Gender Recognition," arXiv preprint arXiv:1603.01249, for IEEE Transactions on Pattern Analysis and Machine Intelligence, 2016, pp. 1-16.

(56) References Cited

OTHER PUBLICATIONS

Sagonas et al., "300 Faces In-The-Wild Challenge: The first facial landmark localization Challenge," ICCV, 2013, pp. 397-403.
Salimans et al., "Improved Techniques for Training GANs," 30th Conference on Neural Information Processing Systems (NIPS), 2016, pp. 1-9.
Saragih et al., "Deformable Model Fitting by Regularized Landmark Mean-Shift," International Journal of Computer Vision, vol. 91, 2011, pp. 200-215.
Sinha et al., "DeepHand: Robust Hand Pose Estimation by Completing a Matrix Imputed with Deep Features," Proceedings of the IEEE Conference on Computer Vision and Pattern Recognition, 2016, pp. 4150-4158.
Sridhar et al., "Interactive Markerless Articulated Hand Motion Tracking Using RGB and Depth Data," Proceedings of the IEEE International Conference on Computer Vision, 2013, pp. 2456-2463.
Sun et al., "Deep Learning Face Representation by Joint Identification-Verification," Advances in Neural Information Processing Systems, Jun. 2014, 10 pages.
Taigman et al., "DeepFace: Closing the Gap to Human-Level Performance in Face Verification," IEEE Conference on Computer Vision and Pattern Recognition, 2014, pp. 1-8.
Tompson et al., "Efficient Object Localization Using Convolutional Networks," IEEE Conference on Computer Vision and Pattern Recognition, 2015, pp. 648-656.
Tompson et a;., "Real-Time Continuous Pose Recovery of Human Hands Using Convolutional Networks," Preprint of ACM Transactions on Graphics, vol. 33, No. 5. 2014, 10 pages.
Weston et al., "Deep Learning via Semi-Supervised Embedding," Neural Networks: Tricks of the Trade, Springer, 2012, 17 pages, retrieved from https://ronan.collobert.com/pub/matos/2012_deeplearning_springer.pdf.
Wu et al., "Discriminative Deep Face Shape Model for Facial Poin tDetection," Preprint of International Journal of Computer Vision, vol. 113, No. 1, 2015, 16 pages, retrieved from https://www.ecse.rpi.edu/~cvrl/wuy/DiscriminativeDeepFaceShape/DiscriminativeDeepFaceShape_IJCV.pdf.
Yu et al., "Multi-Scale Context Aggregation by Dilated Convolutions," International Conference on Learning Representation, 2016, 13 pages, retrieved from https://arxiv.org/pdf/1511.07122.pdf.
Yu et al., "Deep Deformation Network for Object Landmark Localization," preprint of European Conference on Computer Vision, 2016, 17 pages, retrieved from https://arxiv.org/pdf/1605.01014.pdf.
Zhang et al., "Appearance-Based Gaze Estimation in the Wild," preprint IEEE Conference on Computer Vision and Pattern Recognition, 2015, 10 pages, retrieved from https://arxiv.org/pdf/1504.02863.pdf.
Zhao et al., "Stacked What-Where Auto-Encoders," International Conference on Learning Representation—Workshop track, 2016, pp. 1-12, retrieved from https://arxiv.org/pdf/1506.02351.pdf.
Belhumeur et al., "Localizing Parts of Faces Using a Consensus of Exemplars," IEEE Transactions on Pattern Analysis and Machine Intelligence, vol. 35, No. 12, Dec. 2013, pp. 2930-2940.
Dardas et al., "Hand Gesture Recognition Using Bag-of-Features and Multi-Class Support Vector Machine," IEEE International Symposium on Haptic Audio-Visual Environments and Games (HAVE), 2010, 5 pages.
Datcu et al., "Free-Hands Interaction in Augmented Reality," Proceedings of the 1st Symposium on Spatial User Interaction, Jul. 2013, pp. 33-40.
Gross et al., "Multi-PIE," Proceedings of IEEE International Conference on Automatic Face and Gesture Recognition, May 2010, vol. 28, pp. 1-21.
Hariharan et al., "Hypercolumns for Object Segmentation and Fine-grained Localization," CVPR, 2015, pp. 447-456.
He et al., "Deep Residual Learning for Image Recognition," CVPR, IEEE Xplore, 2015, pp. 770-778.
Le et al., "Interactive Facial Feature Localization," European Conference on Computer Vision, 2012, 14 pages.
Mora et al., "Gaze Estimation from Multimodal Kinect Data," Gesture Recognition, and Kinect competitionWorkshop, CVPR, 2012, pp. 4321-4326.
Rasmus et al., "Semi-Supervised Learning with Ladder Networks," preprint, 2015, 19 pages, retrieved from https://arxiv.org/pdf/1507.02672.pdf.
Sun et al., "Cascaded Hand Pose Regression," IEEE Conference on Computer Vision and Pattern Recognition, 2015, pp. 824-832.
Tang et al., "Latent Regression Forest: Structured Estimation of 3D Hand Poses," Proceedings of the IEEE Conference on Computer Vision and Pattern Recognition, 2014, 14 pages.
Xiao et al., "Robust Facial Landmark Detection via Recurrent Attentive-Refinement Networks," European Conference on Computer Vision, 2016, pp. 57-72.
Zhu et al., "Face Detection, Pose Estimation, and Landmark Localization in theWild," IEEE, CVPR, 2012, pp. 2879-2886.
Nalepa et al., "Real-Time Hand Shape Classification," BDAS, 2014, 11 pages, retrieved from https://arxiv.org/pdf/1402.2673.pdf.
U.S. Appl. No. 16/006,709, filed Jun. 12, 2018.

* cited by examiner

US 10,783,394 B2

EQUIVARIANT LANDMARK TRANSFORMATION FOR LANDMARK LOCALIZATION

CLAIM OF PRIORITY

This application claims the benefit of U.S. Provisional Application No. 62/522,520 titled "Landmark Detection with Semi-Supervised Learning," filed Jun. 20, 2017, the entire contents of which is incorporated herein by reference.

FIELD OF THE INVENTION

The present invention relates to landmark detection within images, and more specifically to performing landmark detection using a neural network.

BACKGROUND

Training a neural network to identify landmark locations in images using conventional techniques requires a large training dataset with data pairs that include an image and the ground truth landmark locations. The landmark locations may be identified on an image of a human face and used for emotion recognition, face identity verification, eye gaze tracking, pose estimation, etc. Obtaining a training dataset including a large set of labeled data can be difficult. Landmark labeling is a tedious manual work where precision is important; as a result, few landmark datasets are large enough to train reliable deep neural networks. There is a need for addressing these issues and/or other issues associated with the prior art.

SUMMARY

A method, computer readable medium, and system are disclosed for generating landmark coordinates within images. A transform is applied to input image data to produce transformed input image data. The transform is also applied to predicted coordinates for landmarks of the input image data to produce transformed predicted coordinates. A neural network model processes the transformed input image data to generate additional landmarks of the transformed input image data and additional predicted coordinates for each one of the additional landmarks. Parameters of the neural network model are updated to reduce differences between the transformed predicted coordinates and the additional predicted coordinates.

DETAILED DESCRIPTION

A technique is described that enables training of a neural network model for landmark localization using semi-supervised learning instead of supervised learning. In other words, a small training dataset including precise landmark locations (i.e., ground truth landmarks) is used instead of a large training dataset including precise landmark locations that is typically required to train a neural network model for landmark localization. Construction of the training dataset including precise landmark locations is very time consuming, so only requiring a small training dataset is beneficial. In contrast, construction of a training dataset with a single attribute class label (such as emotion recognition or pose estimation) rather than the entire set of precise landmarks is easier, and training datasets with such single attribute class labels are far more abundant. Therefore, to complete the training, more easily available attribute class labels are used to train the neural network model for landmark localization using sequential multi-tasking, where the tasks include landmark prediction and attribute classification. In one embodiment, only 5% of the input images are labeled with landmark locations.

Figure 1A:
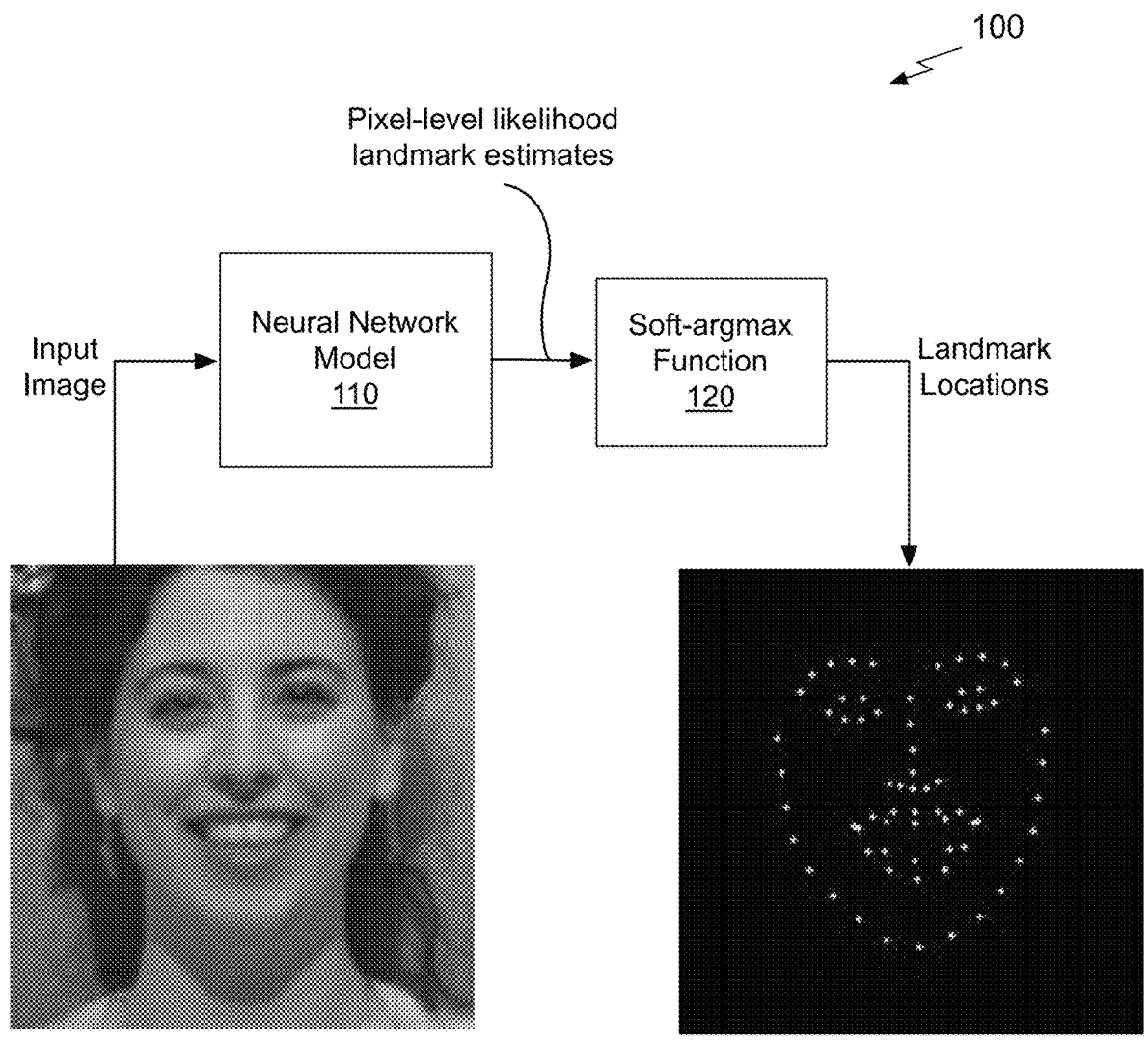
FIG. 1A illustrates a block diagram of a neural network system for landmark localization, in accordance with one embodiment.

FIG. 1A illustrates a block diagram of a neural network system 100 for landmark localization, in accordance with one embodiment. Although the system 100 is described in the context of a processing units, the operations of system 100 may also be performed by a program, custom circuitry, or by a combination of custom circuitry and a program. For example, the system 100 may be implemented by a GPU (graphics processing unit), CPU (central processing unit), or any processor capable of implementing the neural network model. Furthermore, persons of ordinary skill in the art will understand that any system that performs the operations of system 100 is within the scope and spirit of embodiments of the present invention.

A neural network model 110 receives an input image and generates pixel-level likelihood estimates (heat maps) for landmarks. In one embodiment, the neural network model is a convolutional neural network (CNN). In one embodiment, the neural network model is a recurrent neural network (RNN). The heat maps are input to a soft-argmax function 120 to compute coordinates of each landmark by localizing the mode (i.e., coordinates occurring most often) of the likelihood estimate. In one embodiment, the soft-argmax function 120 includes at least one layer. Soft-argmax is a differentiable approximation of the non-differentiable function that returns the location of the element with the maximum amplitude, converting the heat map for a single landmark into an (x,y) coordinate pair in the image. In an embodiment, the soft-argmax is used to find 2D location in the pixel space. In an embodiment, the soft-argmax function is a sum of indices i, multiplied by a pixel-level likelihood estimate associated with each index i In one embodiment, the soft-argmax function 120 for each pixel p is:

$$\text{soft-argmax}(p) = \sum_{i,j} \frac{e^{\beta p_i}}{\sum_j e^{\beta p_j}} i.$$

The neural network model 110 may be included in a sequential multi-tasking system, by providing the landmark locations as inputs to a second neural network model, specifically, an attribute classification model. During supervised training using input images and corresponding class labels without ground truth landmark locations, the class labels provide an auxiliary signal to guide the landmark localization. In one embodiment, errors for the ground truth landmark locations and/or the class labels are backpropagated through the neural network model 110 to improve landmark localization.

Figure 1B:
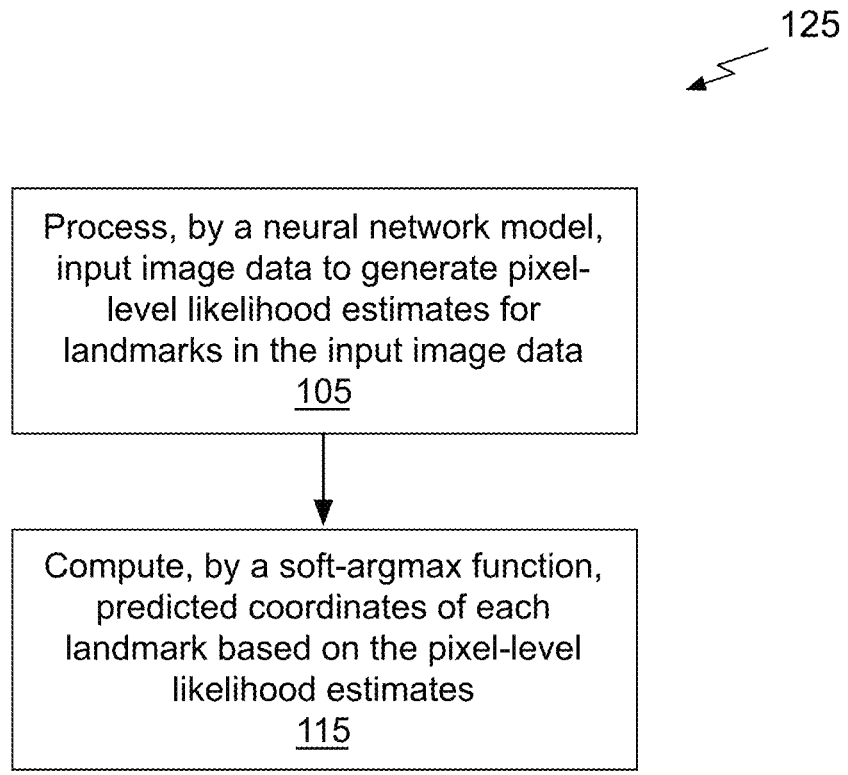
FIG. 1B illustrates a flowchart of a method for performing semi-supervised training landmark localization using a neural network model, in accordance with one embodiment.

FIG. 1B illustrates a flowchart of a method 125 for performing semi-supervised training of a neural network model for landmark localization, in accordance with one embodiment. Although method 125 is described in the context of the system 100, the method 125 may also be performed by a program, custom circuitry, or by a combination of custom circuitry and a program. For example, the method 125 may be executed by a GPU (graphics processing unit), CPU (central processing unit), or any processor capable of implementing the neural network model. Furthermore, persons of ordinary skill in the art will understand that any system that performs method 125 is within the scope and spirit of embodiments of the present invention.

At step 105, the neural network model 110 processes input image data to generate pixel-level likelihood estimates for landmarks in the input image data. In one embodiment, the input image data is red, green, blue color components. In one embodiment, input image data is greyscale. At step 115, the soft-argmax function 120 computes predicted coordinates of each landmark based on the pixel-level likelihood estimates. In one embodiment, the predicted coordinates are (x,y) pairs.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Sequential Multi-Tasking

Figure 1C:
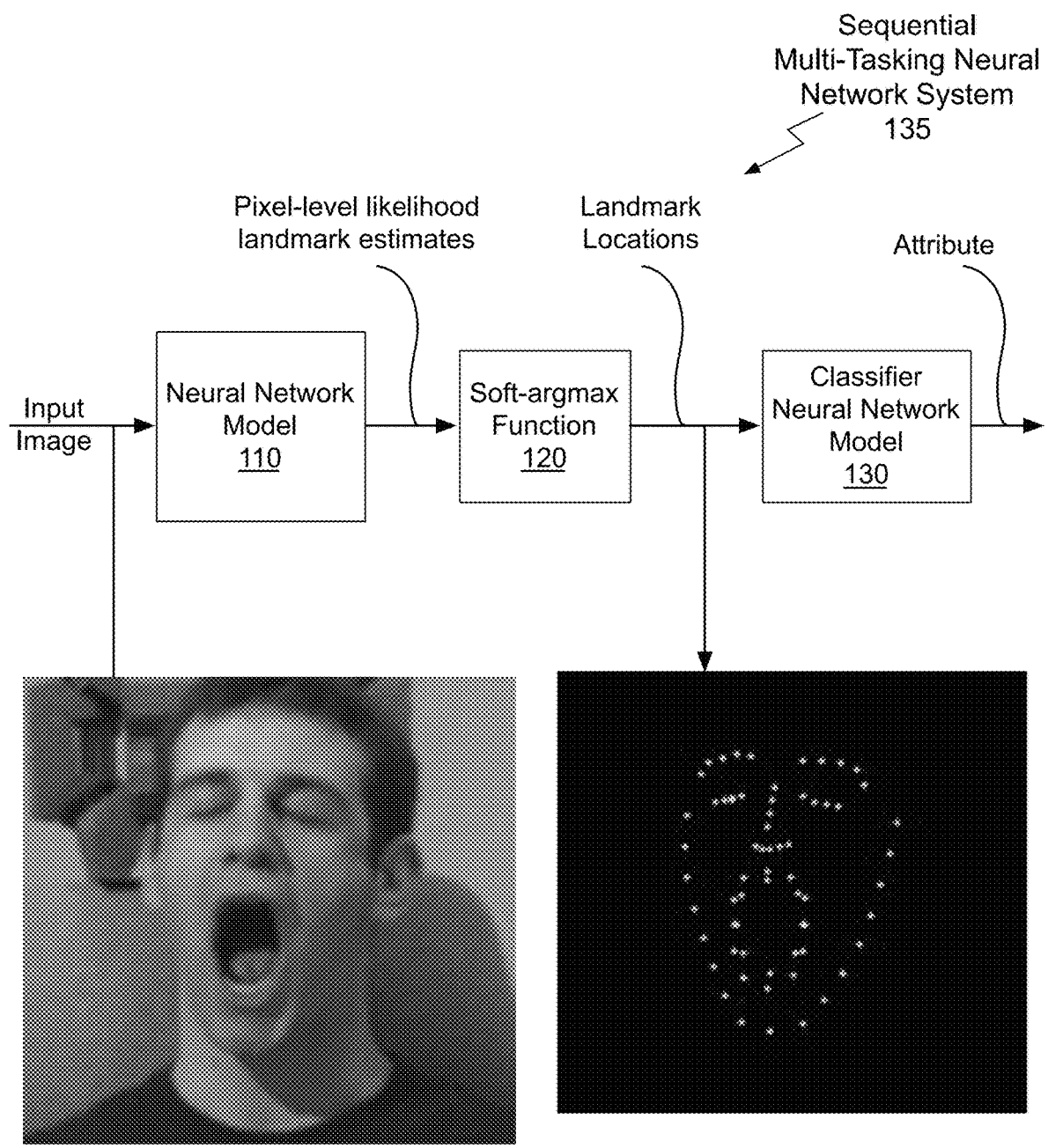
FIG. 1C illustrates a block diagram of a sequential multi-tasking neural network system, in accordance with one embodiment.

FIG. 1C illustrates a block diagram of a sequential multi-tasking neural network system 135, in accordance with one embodiment. Although the system 135 is described in the context of a processing unit, the operations of system 135 may also be performed by a program, custom circuitry, or by a combination of custom circuitry and a program. For example, the system 135 may be implemented by a GPU (graphics processing unit), CPU (central processing unit), or any processor capable of implementing the neural network models. Furthermore, persons of ordinary skill in the art will understand that any system that performs the operations of system 135 is within the scope and spirit of embodiments of the present invention.

The sequential multi-tasking neural network system 135 includes the neural network model 110, the soft-argmax function 120, and a classifier neural network model 130. The landmark locations are input to the classifier neural network model 130. The classifier neural network model 130 processes the landmark locations and generates a predicted attribute for the input image based on the landmark locations. In one embodiment, the classifier neural network model 130 is implemented as a multi-layer perceptron (MLP).

During supervised training ground truth attributes and/or ground truth landmark locations corresponding to the input images are used to train the sequential multi-tasking neural network system 135. In one embodiment, a much larger number of input images are labeled with ground truth attribute class labels than are labeled with landmark locations. Differences between the predicted landmark locations and the ground truth landmark locations are used to compute adjusted parameters for the neural network model 110. Additionally, differences between the ground truth attribute class labels and the predicted attributes generated by the classifier neural network model 130 are used to compute adjusted parameters for the classifier neural network model 130. Additionally, the differences between the ground truth class labels and the predicted attributes are back-propagated through the classifier neural network model 130 and the neural network model 110 to compute adjusted parameters for the neural network model 110 and improve the landmark localization.

In contrast with conventional systems, the systems 100 and 135 perform the tasks of landmark localization in sequence with classification. Using the neural network model 110 to predict the landmark locations and then using the predicted landmarks to perform classification creates a bottleneck in the processing, forcing the classifier neural network mode 130 to solve the classification task only through the landmarks does not necessarily enhance classification performance. However, the goal of the sequential multi-tasking neural network system 135 is landmark localization rather than classification. Generating attributes and performing back-propagation of the attribute class label differences improves landmark localization performance of the sequential multi-tasking neural network system 135 thus accomplishing the goal.

The landmark localization performed by the sequential multi-tasking neural network system 135 benefits from auxiliary tasks, specifically classification, that can be more efficiently solved compared with landmark localization. In contrast with conventional training of neural network models for classification, the sequential multi-tasking neural network system 135 relies only on extracted landmark locations without observing the input image to perform the classification. If the goal of the sequential multi-tasking neural network system 135 were to optimize classification performance, the input image data would be provided directly to the classifier neural network model 130. Additionally, a conventional landmark localization neural network system implements a convolutional neural network (CNN) without including any classification processing.

The class label can be considered a weak label that, when back-propagated during training of the sequential multi-tasking neural network system 135, provides indirect signals about landmarks. For example, a photo of a hand gesture with the label "waving" likely indicates that the hand is posed with an open palm and spread fingers, signaling a set of reasonable locations for landmarks on the hand. The class labels are more abundant or more easily obtainable than landmark labels, making larger and/or more training datasets available for landmark localization training.

Figure 1D:
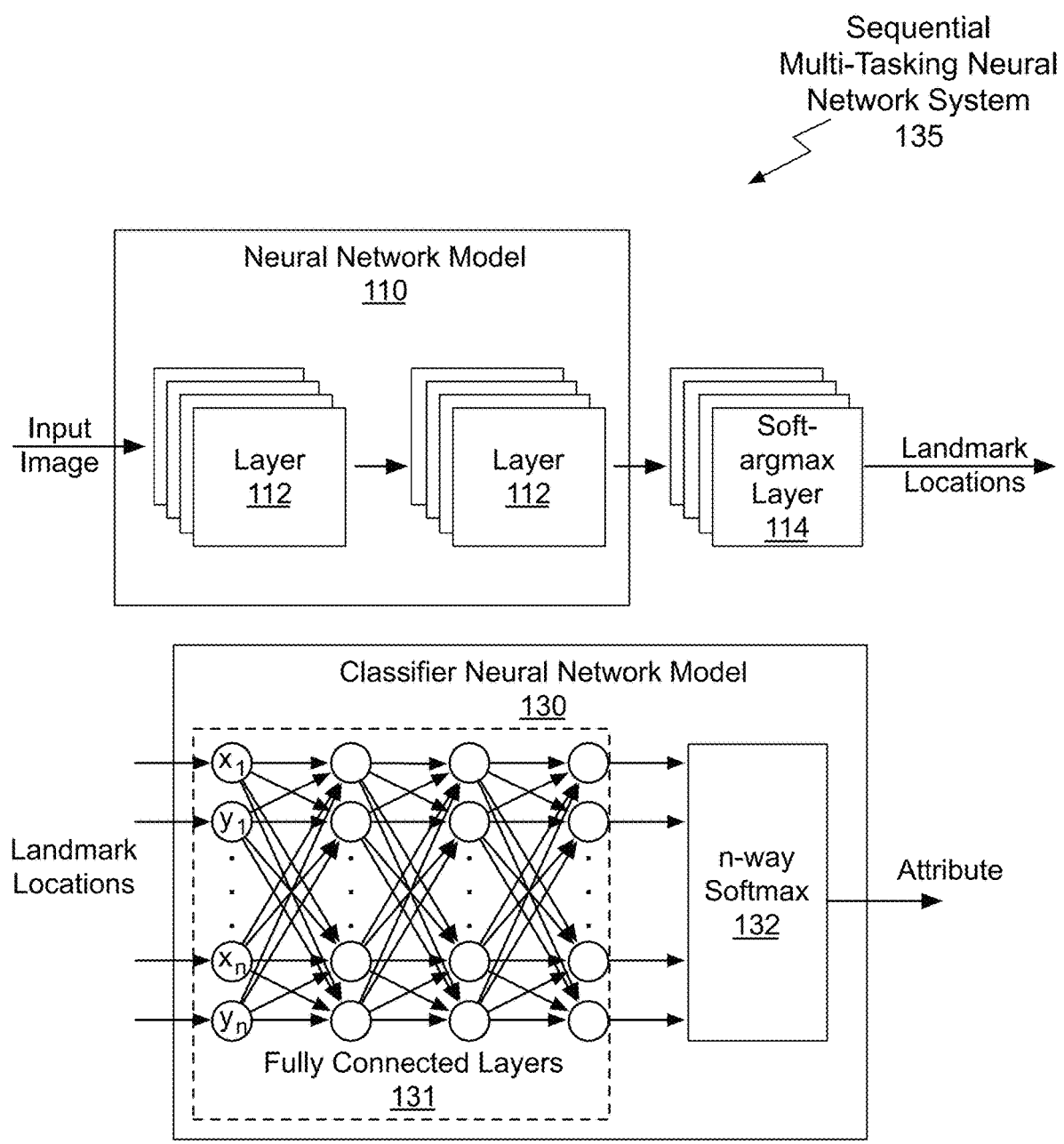
FIG. 1D illustrates a detailed block diagram of the sequential multi-tasking neural network system shown in FIG. 1C, in accordance with one embodiment.

FIG. 1D illustrates a detailed block diagram of the sequential multi-tasking neural network system 135 shown in FIG. 1C, in accordance with one embodiment. The neural network model 110 includes at least one layer 112 followed by a soft-argmax layer 114. In one embodiment, each layer 112 is repeated n times (represented as the stacked layers) without parameter sharing. In one embodiment, each layer 112 is a convolutional layer without pooling and without strided convolutions. Because pooling layers are omitted, the layers 112 maintain high resolution feature maps and pixel-level heatmaps are available to predict locations of the landmarks.

In one embodiment, the neural network model 110 includes six convolutional layers with 7×7 kernels, followed by two convolutional layers with 1×1 kernels, then the soft-argmax layer 114 for landmark localization. The classifier neural network model 130 includes one or more fully connected (FC) layers 131 and a final classification n-way softmax layer 132 that implements a softmax function. In one embodiment, the classifier neural network model 130 includes two fully connected layers of size 40 and 2, respectively.

Use of the soft-argmax layer 114 to extract landmark locations from pixel-level predictions makes the entire sequential multi-tasking system 135 differentiable and trainable end-to-end through back-propagation. Training the neural network model 110 to learn landmarks with back-propagation allows the classification task to enhance landmark localization learning since the neural network model 110 is influenced by the task of predicting class labels performed by the classifier neural network model 130. Differences are computed between the predicted class labels (attributes) output by the classifier neural network model 130 and the GT attribute labels for the training dataset. Differences may also be computed between GT landmark labels (when available) and the predicted landmark locations output by the neural network model 220. The differences represent errors that are propagated backwards through the classifier neural network model 130 and used to update parameters (e.g., weights) used by the neural network model 110 to predict the landmark locations (i.e., landmark coordinates). The parameters are updated to reduce the differences and improve accuracy.

The soft-argmax layer 114 is applied to the output of the last layer 112 in the neural network model 110. Specifically, M(I) is the stack of K two-dimensional output maps produced by the last layer 112 for a given network input image I. The map associated with the kth landmark will be denoted $M_k(I)$. To obtain a single two-dimensional location $L_k=(x,y)$ for the landmark from $M_k(I)$, the following soft-argmax operation may be used:

$$L_k(I) = \text{soft-argmax}(\beta M_k(I)) \quad (1)$$

$$= \sum_{i,j} \text{softmax}(\beta M_k(I))_{i,j}(i, j)$$

where softmax denotes a spatial softmax of the map, i.e. $\text{softmax}(A)_{i,j} = \exp(A_{i,j})/\Sigma_{i',j'} \exp(A_{i',j'})$. $\beta$ controls the temperature of the resulting probability map, and (i, j) iterate over pixel coordinates. In short, soft-argmax computes landmark coordinates $L_k=(x,y)$ as a weighted average of all pixel coordinate pairs (i, j) where the weights are given by a softmax of landmark map $M_k$.

Predicted landmark coordinates are then fed into the classification neural network model 130 for attribute estimation. Performing either the classification or regression (i.e., training) task, the neural network model 130 optimizes $$\text{Cost-}attr = \begin{cases} -\log P(\mathbb{A} = \tilde{a} \mid \mathbb{I} = I), & \text{if classification} \\ |\tilde{a} - a(I)|, & \text{if regression (training)} \end{cases}$$

$P(\mathbb{A}=\tilde{a}|\mathbb{I}=I)$ denotes the probability ascribed by the model to the class $\tilde{a}$ given input image I, as computed by the final classification n-way softmax layer 132, $\tilde{a}$ and a(I) denote the ground truth (GT) and predicted attributes in the regression task. Using soft-argmax, as opposed to a simple softmax, the neural network model 110 is fully differentiable through the landmark locations and the sequential multi-tasking system 135 is trainable end-to-end. In other words, the neural network model 110 and the classifier neural network model 130 can be simultaneously trained for both landmark localization and attribute classification tasks.

Computed errors between GT attribute class labels and generated attributes output by the classifier neural network model 130 are recursively back-propagated through the layers of the classifier neural network model 130 and the neural network model 110 to update parameters used for both attribute classification and landmark localization. In the prior art, a neural network would be trained to perform attribute classification for input images without completing the intermediate step of generating landmark coordinates.

Figure 1E:
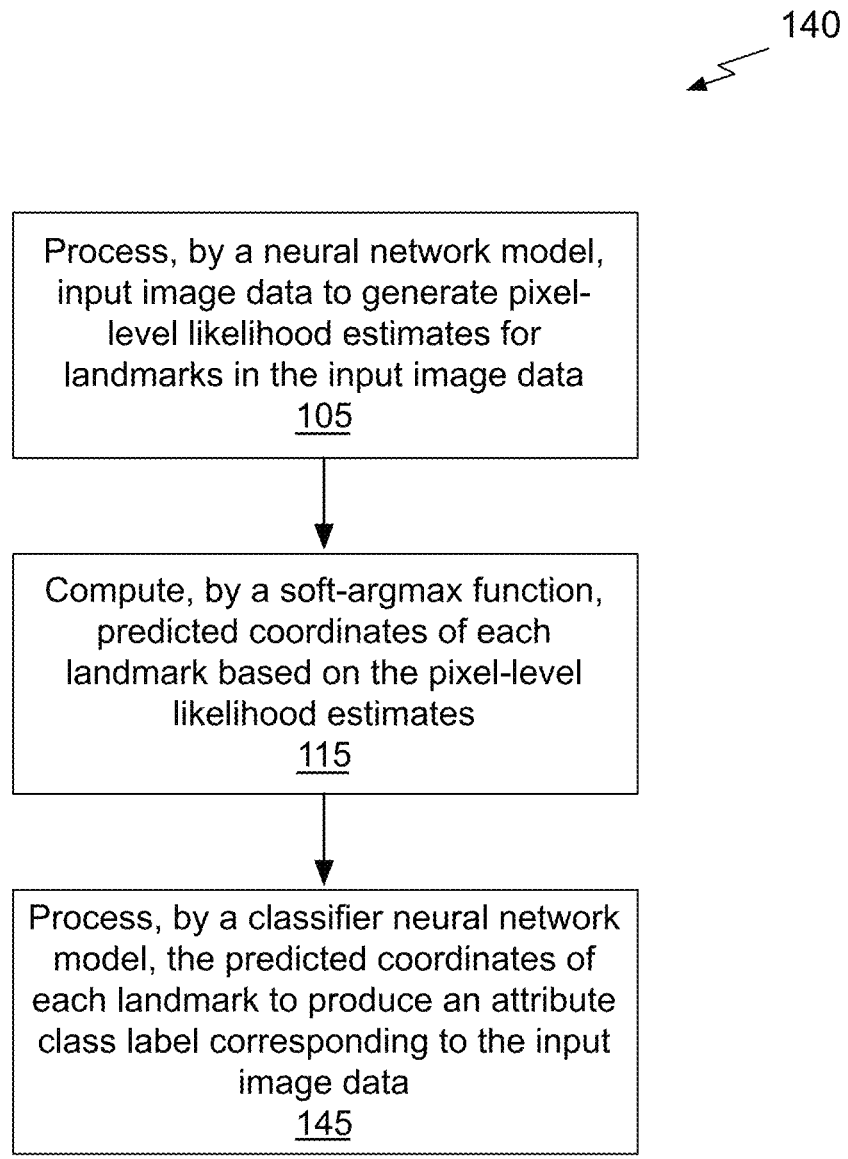
FIG. 1E illustrates another flowchart of a method for performing landmark localization and classification using the sequential multi-tasking system, in accordance with one embodiment.

FIG. 1E illustrates another flowchart of a method 140 for performing landmark localization and classification using the sequential multi-tasking neural network system 135, in accordance with one embodiment. Although method 140 is described in the context of the system 135, the method 140 may also be performed by a program, custom circuitry, or by a combination of custom circuitry and a program. For example, the method 140 may be executed by a GPU (graphics processing unit), CPU (central processing unit), or any processor capable of implementing the neural network model. Furthermore, persons of ordinary skill in the art will understand that any system that performs method 140 is within the scope and spirit of embodiments of the present invention.

Steps 105 and 115 are performed as previously described in conjunction with FIG. 1B. At step 145, the classifier neural network model 130 processes the predicted coordinates of each landmark to produce an attribute class label corresponding to the input image data. Steps 105, 115, and 145 may be performed during training of the sequential multi-tasking neural network system 135 or when the sequential multi-tasking neural network system 135 is deployed for landmark localization of unlabeled input images.

Figure 1F:
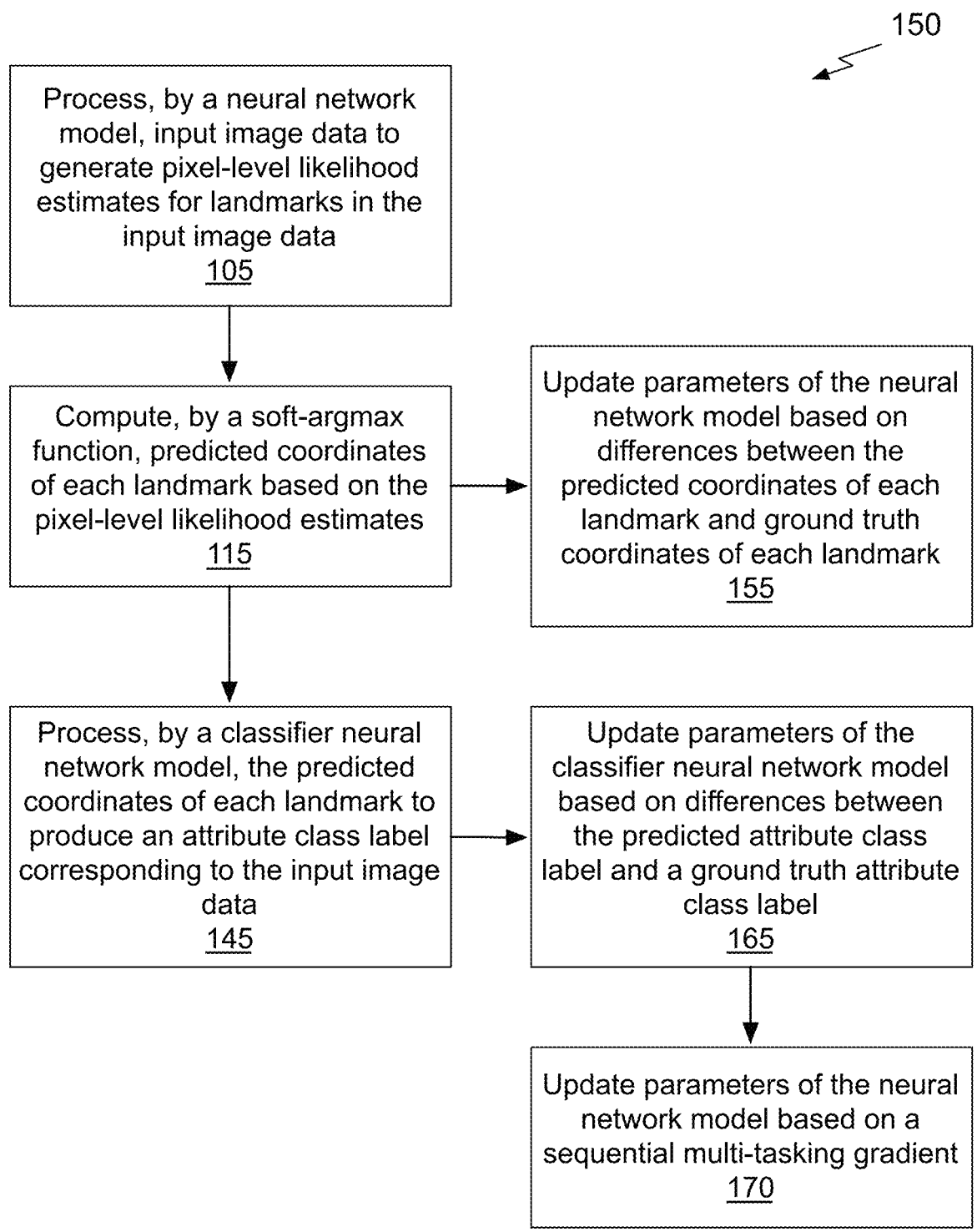
FIG. 1F illustrates a flowchart of a method for semi-supervised training of the sequential multi-tasking neural network system, in accordance with one embodiment.

FIG. 1F illustrates a flowchart of a method 150 for semi-supervised training of the sequential multi-tasking neural network system 135, in accordance with one embodiment. Although method 150 is described in the context of the system 135, the method 150 may also be performed by a program, custom circuitry, or by a combination of custom circuitry and a program. For example, the method 150 may be executed by a GPU (graphics processing unit), CPU (central processing unit), or any processor capable of implementing the neural network model. Furthermore, persons of ordinary skill in the art will understand that any system that performs method 150 is within the scope and spirit of embodiments of the present invention.

Steps 105, 115, and 145 are performed as previously described in conjunction with FIG. 1B. At step 155, when GT coordinates of each landmark are available for supervised training, parameters of the neural network model 110 are updated based on differences between the predicted coordinates of each landmark and the GT coordinates of each landmark. The parameters of the neural network model 110 are updated to reduce the differences and improve accuracy of the neural network model 110.

At step 165, when GT attribute class labels are available for supervised training, parameters of the classifier neural network model 130 are updated based on differences between the predicted attribute class labels and the GT attribute class labels. The parameters of the classifier neural network model 130 are updated to reduce the back-propagated differences and improve accuracy of the classifier neural network model 130. At step 170, parameters of the neural network model 110 are updated based on a sequential multi-tasking gradient. The sequential multi-tasking gradient is computed by back-propagating differences between the predicted attribute class labels and the GT attribute class labels through the classifier neural network model 130. The parameters of the neural network model 110 are updated to reduce the back-propagated differences and improve accuracy of the neural network model 110.

A conventional approach to multi-task learning uses a traditional CNN, in which a final common fully-connected (FC) layer feeds into separate branches, each dedicated to the output for a different task. Such an approach learns shared low-level features across the set of tasks and acts as a regularizer, particularly when the individual tasks have few labeled samples. The sequential multi-tasking neural network system 135 may be modified to perform the landmark localization in parallel with attribute classification.

Figure 2A:
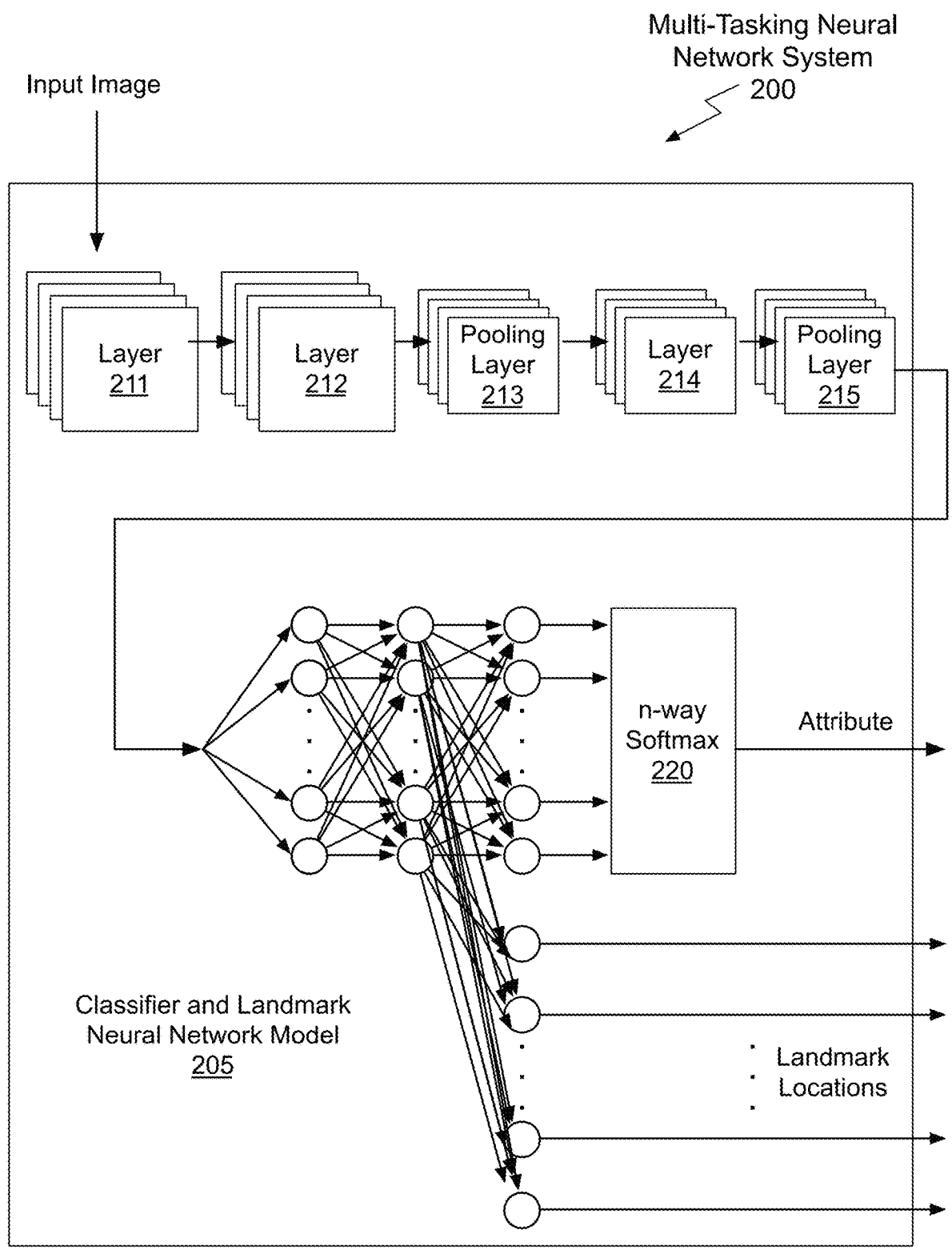
FIG. 2A illustrates a detailed block diagram of a multi-tasking neural network system, in accordance with one embodiment.

FIG. 2A illustrates a detailed block diagram of a multi-tasking neural network system 200, in accordance with one embodiment. Compared with the sequential multi-tasking neural network system 135, the multi-tasking neural network system 200 includes one or more pooling layers 213 and 215 within a classifier and landmark neural network model 205. Additional layers 211, 212, and 214 are also included in the neural network model 205. The classifier and landmark neural network model 205 receives an input image and applies a series of convolutional layers 211, 212, and 214 and pooling layers 213 and 215 before passing the processed data to two or more fully connected layers. A final pair of fully connected layers includes a first fully connected layer that generates landmark locations and a second fully connected layer that inputs processed data to the n-way softmax 132 to generate a predicted attribute class label.

In contrast with the sequential multi-tasking neural network system 135, the multi-tasking neural network system 200 does not predict landmark locations as an intermediate step before attribute classification. Instead, the landmark locations are predicted dependent on the attribute classification processing and in parallel with attribute classification. In other words, the attribute classification predictions are not forced to flow through the intermediate step of landmark localization. In contrast, in sequential multi-tasking neural network system 135, auxiliary classification tasks and data are leveraged, enhancing landmark localization by back-propagating attribute classification errors through the landmark localization layers of the sequential multi-tasking neural network system 135.

Figure 2B:
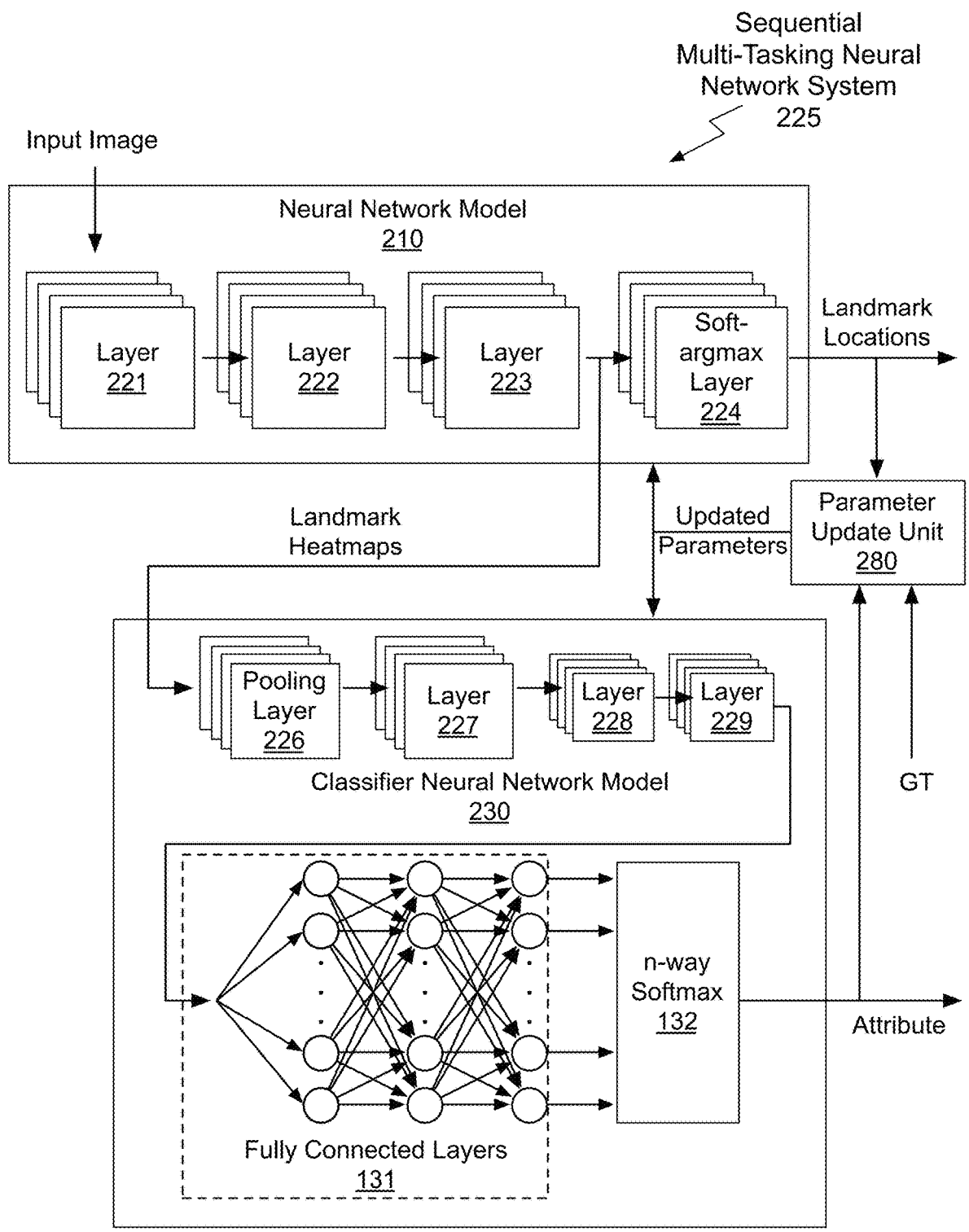
FIG. 2B illustrates a sequential multi-tasking neural network system, in accordance with one embodiment.

FIG. 2B illustrates a sequential multi-tasking neural network system 225, in accordance with one embodiment. In one embodiment, the sequential multi-tasking neural network system 225 is another detailed block diagram of the neural network system for sequential multi-tasking 135 shown in FIG. 1C, in accordance with one embodiment.

As shown in FIG. 2B, the neural network model 210 includes layers 221, 222, and 223 followed by a soft-argmax layer 224. In one embodiment, the neural network model 210 includes fewer or more layers. In one embodiment, each layer 221, 222, and 223 is repeated at least once or any positive number of m times (represented as the stacked layers) without parameter sharing. In one embodiment, each layer 221, 222, and 223 is a convolutional layer without pooling and without strided convolutions. Because pooling layers are omitted, the layers 221, 222, and 223 maintain high resolution feature maps and pixel-level heatmaps are available to predict locations of the landmarks. In one embodiment, the neural network model 210 includes six convolutional layers with 7×7 kernels, followed by two convolutional layers with 1×1 kernels, then the soft-argmax layer 224 for landmark localization.

The pixel-level landmark heatmaps that are generated by the neural network model 210 and input to the soft-argmax layer 224 are also input to a classifier neural network model 230. The pixel-level landmark heatmaps are processed by a pooling layer 226 and layers 227, 228, and 229 before reaching the fully connected layers 131. The classifier neural network model 230 includes the one or more fully connected (FC) layers 131 and the final classification n-way softmax layer 132 that implements the n-way softmax function.

A parameter update unit 280 receives the predicted class labels (attributes) output by the classifier neural network model 130 and computes differences between the predicted class labels and the GT attribute labels for the training dataset. Differences may also be computed between GT landmark labels (when available) and the predicted landmark locations output by the neural network model 220. The differences represent errors that are propagated backwards through the classifier neural network model 230 and used to update parameters (e.g., weights) used by the neural network model 110 to predict the landmark locations (i.e., landmark coordinates).

Figure 2C:
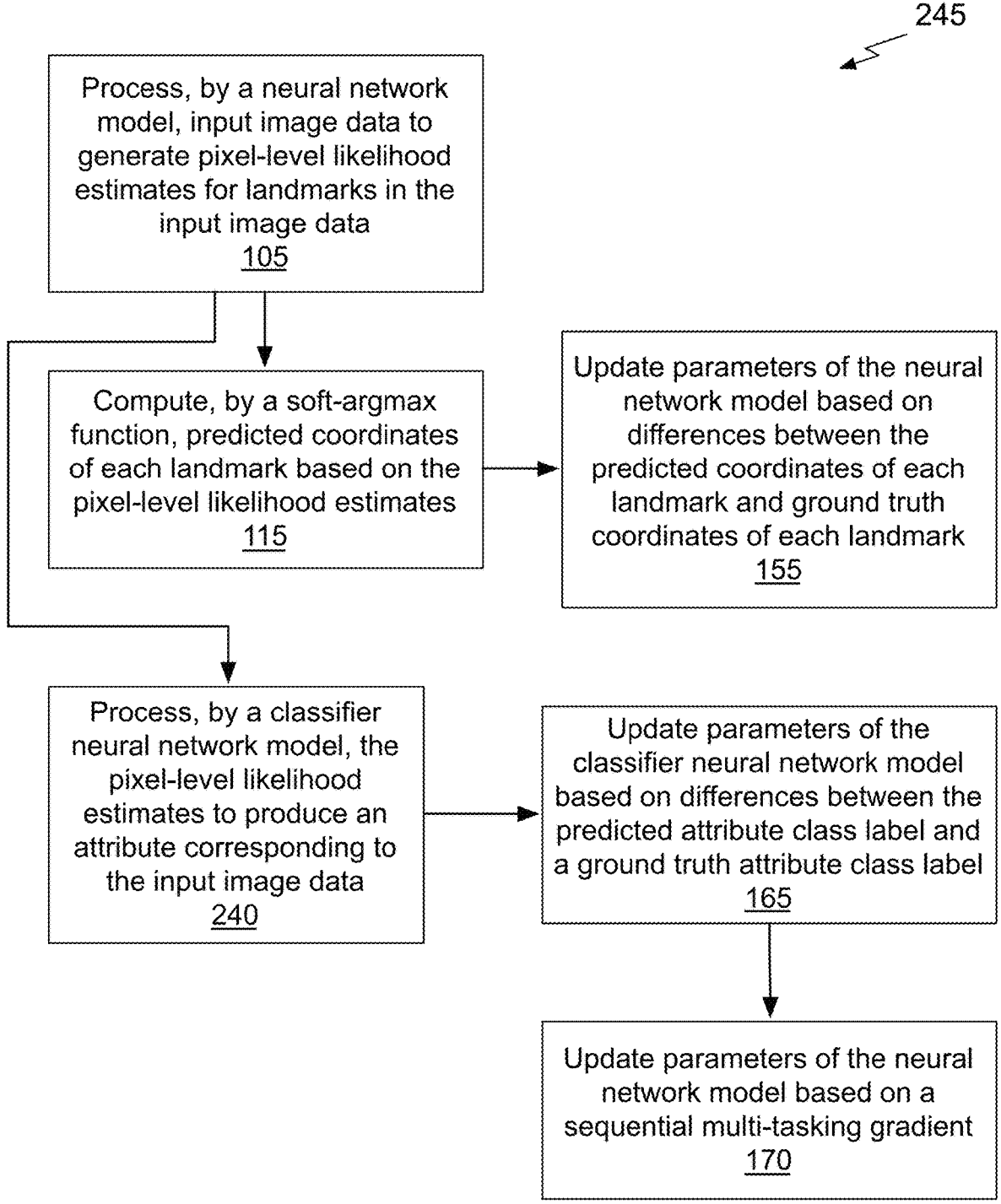
FIG. 2C illustrates a flowchart of another method for performing semi-supervised training of the sequential multi-tasking neural network system shown in FIG. 2B, in accordance with one embodiment.

FIG. 2C illustrates a flowchart of another method 245 for semi-supervised training of the sequential multi-tasking neural network system 225 shown in FIG. 2B, in accordance with one embodiment. Although method 245 is described in the context of the system 225, the method 245 may also be performed by a program, custom circuitry, or by a combination of custom circuitry and a program. For example, the method 245 may be executed by a GPU (graphics processing unit), CPU (central processing unit), or any processor capable of implementing and training the neural network model. Furthermore, persons of ordinary skill in the art will understand that any system that performs method 245 is within the scope and spirit of embodiments of the present invention.

Steps 105 and 115 are performed as previously described in conjunction with FIG. 1B. At step 240, the classifier neural network model 230 processes the pixel-level likelihood estimates for each landmark to produce an attribute class label corresponding to the input image data. Steps 105, 115, and 240 may be performed during training of the sequential multi-tasking neural network system 225 or when the sequential multi-tasking neural network system 225 is deployed for landmark localization of unlabeled input images.

Steps 155, 165, and 170 are performed as previously described in conjunction with FIG. 1F. When GT coordinates of each landmark are available for supervised training, the parameter update unit 280 may be configured to perform step 155. when GT attribute class labels are available for supervised training, the parameter update unit 280 may be configured to perform step 165. The parameter update unit 280 computes the sequential multi-tasking gradient by back-propagating differences between the predicted attribute class labels and the GT attribute class labels through the classifier neural network model 130. Therefore, the GT attribute class labels are used to perform semi-supervised training of the neural network model 210 for landmark localization. At step 170, the parameter update unit 280 updates the parameters of the neural network model 110 to reduce the back-propagated differences and improve accuracy of the neural network model 110.

As previously explained, in the prior art, a neural network would be trained to perform attribute classification for input images without completing the intermediate task of generating landmark coordinates. Completing the intermediate task enables recursive back-propagation of the errors through the layers of the classifier neural network model 230 and the neural network model 210 to update parameters used for both attribute classification and landmark localization, thereby improving accuracy of both tasks. In one embodiment, a small number (S) of input images labeled with ground truth landmark locations (i.e., coordinates) for supervised learning are included in a first training dataset and a larger number (M) of input images labeled with ground truth attribute class labels are included in a second training dataset, where S<<M. In one embodiment, only the second training dataset is used to train the sequential multi-tasking neural network system 225 for both landmark localization and attribute classification.

Equivariant Landmark Transformation

There is a fundamental caveat to simultaneous training for classification and landmark localization tasks, because the two tasks have opposing requirements. Specifically, classification needs to be insensitive (invariant) to small deformations such as translations, whereas landmark localization needs to be equivariant to small deformations. In other words, landmark localization should follow the small deformations precisely with high sensitivity. The opposing requirements is a reason to perform landmark localization in parallel with attribute classification rather than performing perform landmark localization and attribute classification in sequence. To build in invariance, traditional convolutional neural networks for classification rely on pooling layers to integrate signals across the input image. However, tasks such as landmark localization or image segmentation require both the global integration of information as well as an ability to retain local, pixel-level details for precise localization.

An unsupervised learning technique may be employed to train the neural network model 110 or 210 to generate predictions that are consistent when different transformations are applied to the input image. Consider an input image I and the corresponding landmarks L(I) predicted by the neural network model 110 or 210. Now consider a small affine coordinate transformation T. T $\odot$ . . . denotes the application of such a transformation in coordinate space, whether the transformation is applied to deform a bitmap image or to transform actual coordinates. If the transformation is applied to produce a deformed image I'=T$\odot$I and then the resulting landmark coordinates L(I') are computed by the neural network model 110 or 210, the resulting landmark coordinates should be very close to the result of applying the transformation on landmark coordinates L(I) i.e., L(T$\odot$I)≈T$\odot$L(I). The technique for unsupervised training of the neural network model 110 or 210 to generate predictions that are consistent when different transformations are applied to the input image is referred to as equivariant landmark transformation. Assuming $C_T$ is the cost function associated with a single transformation operator T, multiple instances of $C_T$ can thus be added to the overall training cost, each corresponding to a different transformation T.

Figure 2D:
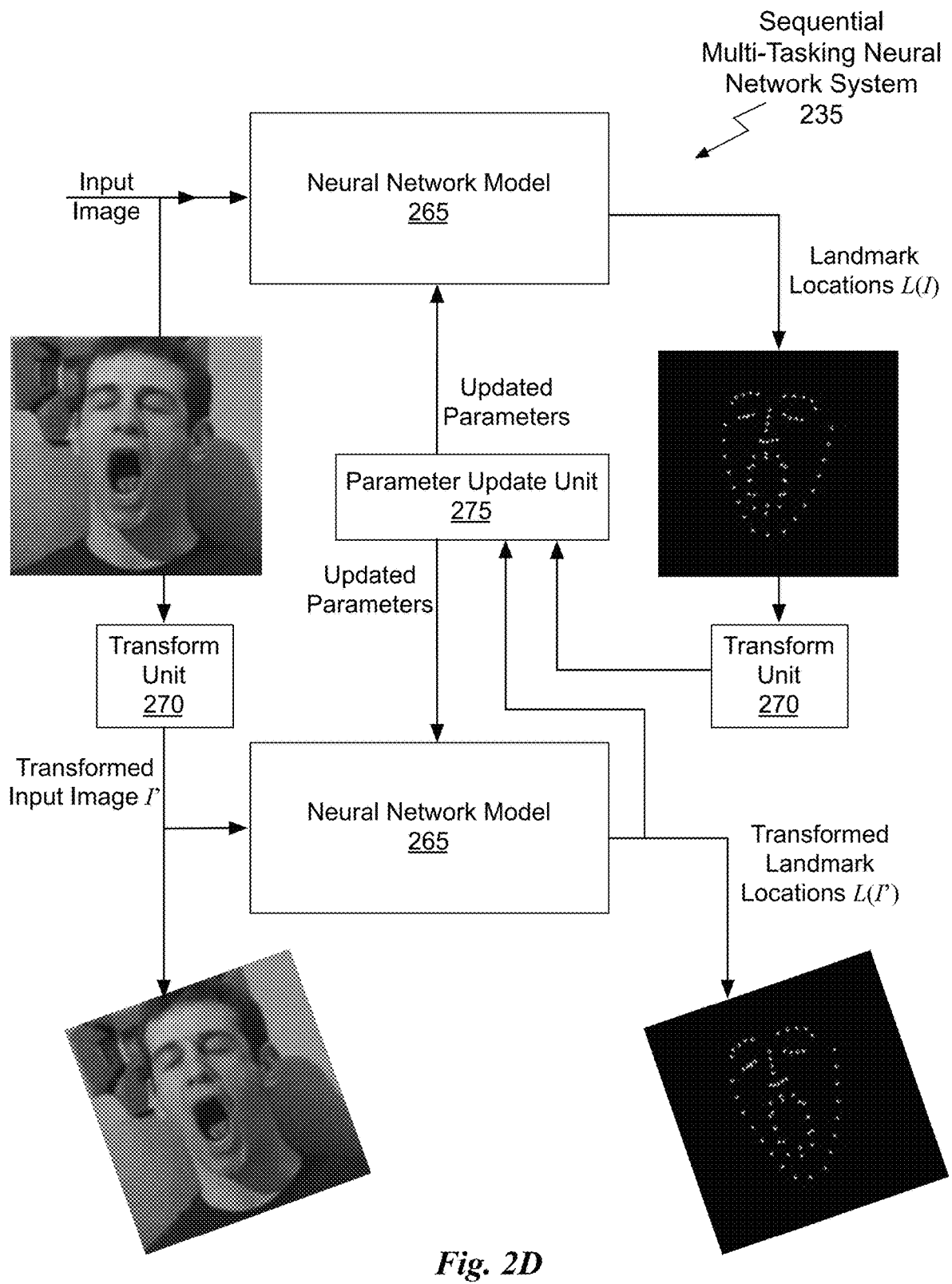
FIG. 2D illustrates a block diagram of a sequential multi-tasking neural network system for unsupervised training using equivariant landmark transformation, in accordance with one embodiment.

FIG. 2D illustrates a block diagram of a sequential multi-tasking neural network system 235 for unsupervised training using equivariant landmark transformation (ELT), in accordance with one embodiment. The sequential multi-tasking neural network system 235 includes a first neural network model 265 for generation of landmark locations and a second neural network model 265 for generation of transformed landmark locations. In one embodiment, the first and second neural network models 265 are any combination of the neural network model 210, the neural network model 110 with the soft-argmax layer 114, and the neural network model 110 with the soft-argmax function 120.

A transform unit 270 may be configured to apply different transformations T to each input image to generate transformed input images. The second neural network model 265 processes the transformed input images to produce transformed landmark locations. The transform unit 270 may also be configured to apply the different transformations T to the predicted landmark locations corresponding to each input image that are generated by the first neural network model 265 to produce transformed predicted landmark locations. In one embodiment, at least a portion of the different transformations are affine transformations. In one embodiment, the first and second neural network models 265 are a single neural network model that is configured to generate the predicted landmark locations and the transformed landmark locations either in parallel or in series.

A parameter update unit 275 receives the transformed predicted landmark locations output by the first neural network model 265 and the transformed landmark locations output by the second neural network model 265. The parameter update unit 275 computes differences between the transformed predicted landmark locations and transformed landmark locations and produces updated parameters for the first and/or second neural network models 265. The parameters are updated to reduce the differences between the transformed landmark locations and the transformed predicted landmark locations to maximize equivariance to image transformations. When supervised training is performed, the parameter update unit 280 may be configured to compute differences between GT landmark labels (when available) and the predicted landmark locations output by the first neural network model 265. In one embodiment, the differences are gradients and are a component of the composite loss. Reducing the composite loss encourages the neural network models 265 to output landmark locations that are equivariant to transformations applied to the input image. Importantly, semi-supervised and unsupervised training of the neural network models 265 are applied to the predicted landmark locations and not the ground truth (GT) landmark locations, so the training datasets for semi-supervised and unsupervised training need not include landmark location labels for the input images.

A training dataset that does include ground truth landmark locations for each input image may be used to generate additional training data for unsupervised training by transforming the input images. Importantly, there is no need to transform the corresponding ground truth landmark locations because they are not needed for the unsupervised training. In one embodiment, a number (N) input images are labeled with ground truth landmarks, where S<<M≤N. The N input images and ground truth landmarks may be included in a third dataset and the N input image may also be used to perform unsupervised training with the ELT technique.

Figure 2E:
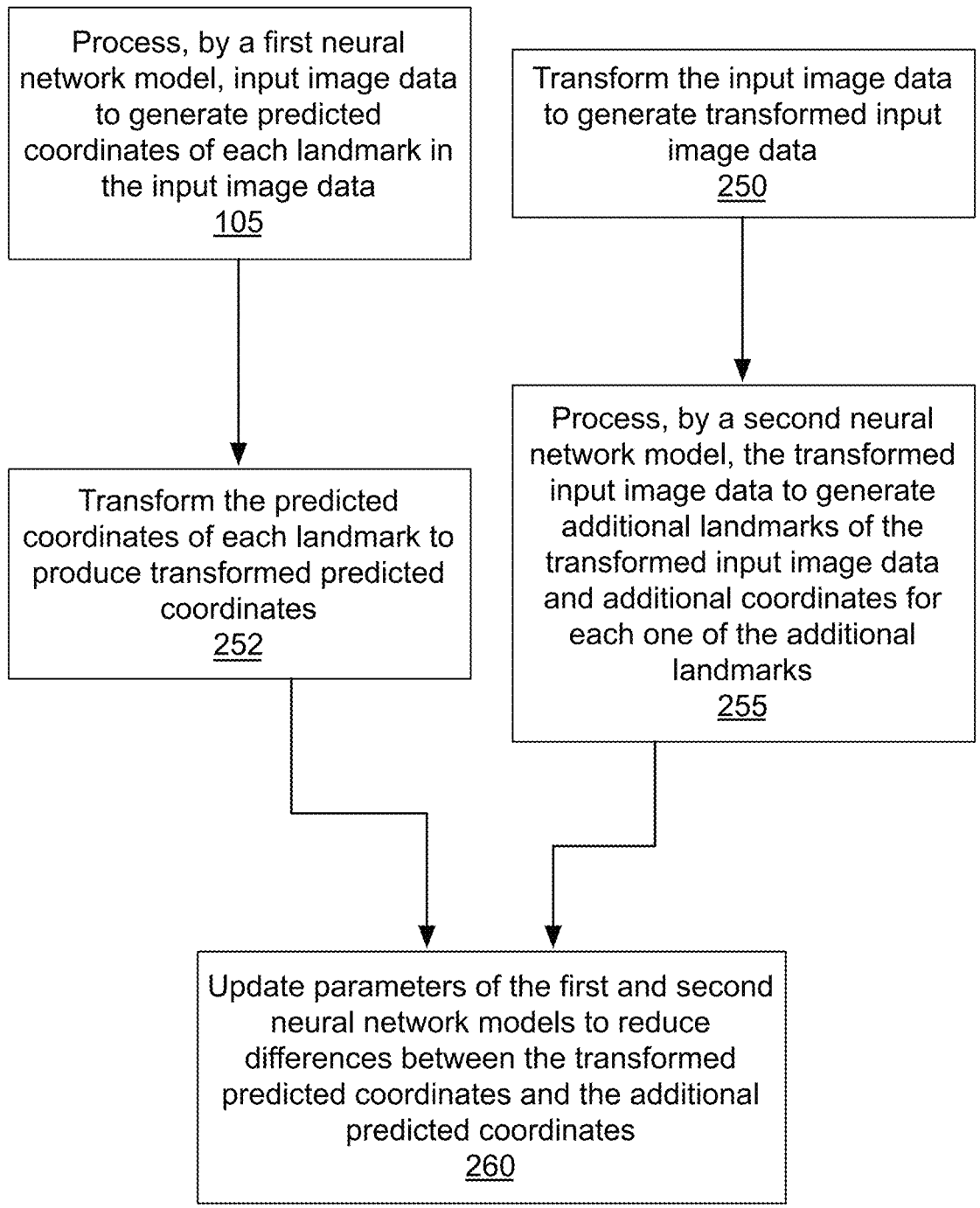
FIG. 2E illustrates a flowchart of a method for training a sequential multi-tasking neural network system using equivariant landmark transformation, in accordance with one embodiment.

FIG. 2E illustrates a flowchart of a method 242 for training a sequential multi-tasking neural network system using equivariant landmark transformation, in accordance with one embodiment. Although method 242 is described in the context of the system 235, the method 242 may also be performed by a program, custom circuitry, or by a combination of custom circuitry and a program. For example, the method 242 may be executed by a GPU (graphics processing unit), CPU (central processing unit), or any processor capable of implementing and training the neural network model. Furthermore, persons of ordinary skill in the art will understand that any system that performs method 242 is within the scope and spirit of embodiments of the present invention.

Step 105 is performed by a first neural network model 265 as previously described in conjunction with FIG. 1B. At step 252, the transform unit 270 transforms the predicted coordinates of each landmark to produce transformed predicted coordinates. At step 250, the transform unit 270 transforms the input image data to generate transformed input image data. At step 255, the second neural network model 265 processes the transformed input image data to generate additional landmarks of the transformed input image data and additional coordinates for each one of the additional landmarks. At step 260, the parameter update unit 275 updates parameters of the first and second neural network models 265 to reduce differences between the transformed predicted coordinates and the additional predicted coordinates. The unsupervised learning technique for landmark localization performed by the method 242 produces landmark localizations that are equivariant with respect to a set of transformations applied to each input image. Importantly, the ELT technique does not require the true landmark locations, and thus can be applied during semi-supervised training to leverage input images with labeled attributes and without labeled landmarks.

Figure 2F:
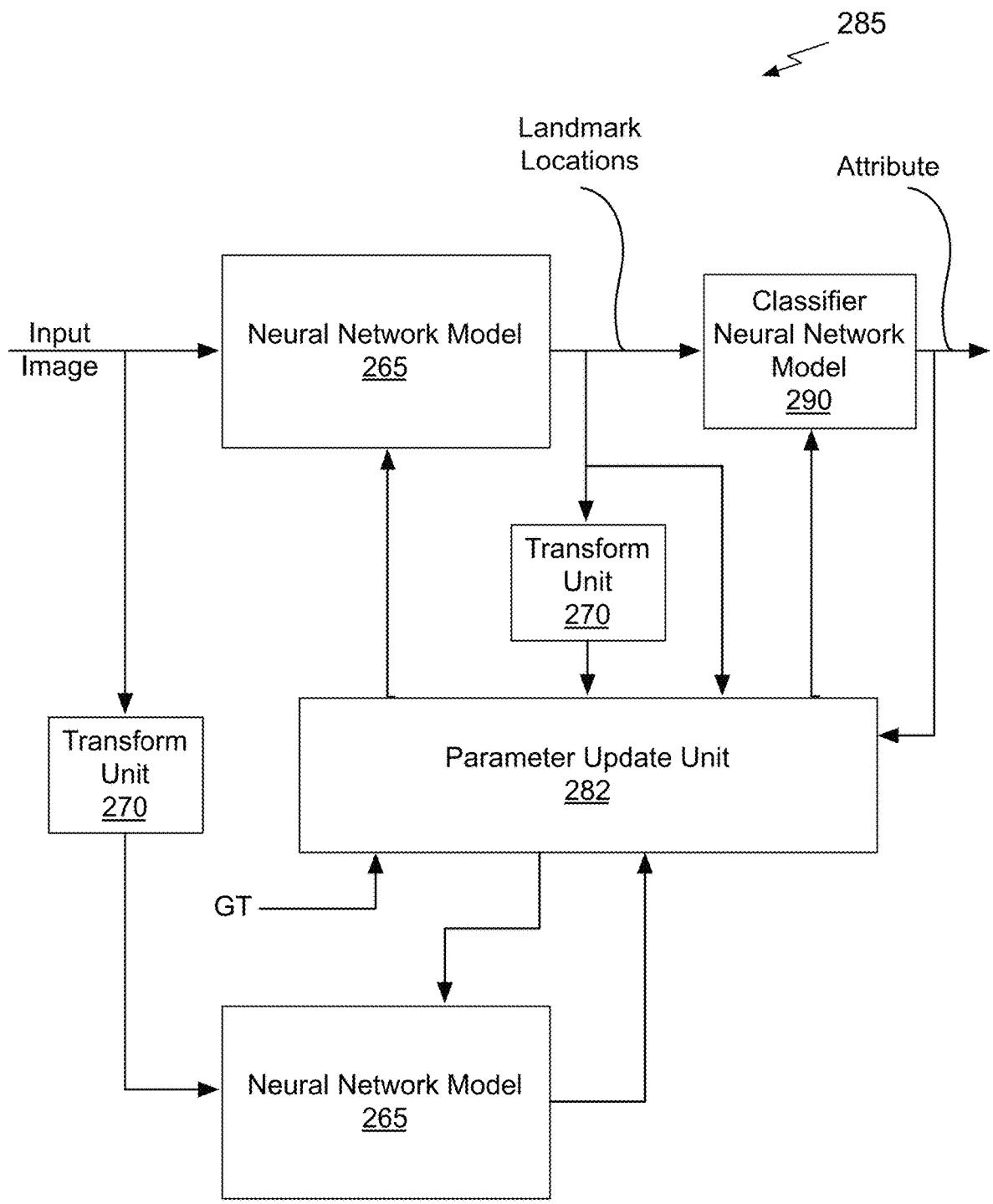
FIG. 2F illustrates a block diagram of a sequential multi-tasking neural network system for supervised and unsupervised training, in accordance with one embodiment.

FIG. 2F illustrates a block diagram of a sequential multi-tasking neural network system 285 for supervised and unsupervised training, in accordance with one embodiment. The sequential multi-tasking neural network system 285 includes at least one neural network model 265. The sequential multi-tasking neural network system 285 includes at least one classifier neural network model 290. The classifier neural network model 290 comprises one of the classifier neural network model 130 and the classifier neural network model 230. In one embodiment, when the neural network models 265 is the neural network model 210, the landmark heatmaps are output by the neural network model 265 to the classifier neural network model 230.

A parameter update unit 282 may be configured to perform the operations performed by the parameter update unit 275 (step 260 of FIG. 2E) and/or steps 155, 165, and 170 of FIGS. 1F and 2C. In one embodiment, the entire sequential multi-tasking system 285 is trained end-to-end to minimize the following cost $$\text{Cost} = \frac{1}{N} \sum_{(I,\tilde{a}) \in \mathcal{D}} \left\{ \text{Cost}_{attr} + \frac{\alpha}{K} \sum_{k=1}^{K} \|T \odot L_k(I) - L_k(T \odot I)\|_2^2 \right\} + \frac{\lambda}{SK} \sum_{L} \sum_{k=1}^{K} \|\tilde{L}_k - L_k(I)\|_2^2 + \gamma \|\mathbb{W}\|_2^2, \quad (2)$$

Where $\mathcal{D}$ is the training dataset containing N pairs (I, ã) of input image and GT attribute class label. K is the number of landmarks. $\tilde{L}_k$, $L_k(I)$, and S respectively correspond to the GT, predicted landmarks and the number of images in the training dataset with labelled landmarks. $\mathbb{W}$ represents the parameters of the neural network model 110 and the classifier neural network model 130, where α, λ, and γ are weights for losses. The first part of the cost:

$$\frac{1}{N} \sum_{(I,\tilde{a}) \in \mathcal{D}} \{\text{Cost}_{attr}\}$$

is attribute classification or regression and affects the entire sequential multi-tasking system 285. $\text{Cost}_{attr}$ may include the ELT cost function $C_T$. The second part of the cost $$\frac{\alpha}{K} \sum_{k=1}^{K} \|T \odot L_k(I) - L_k(T \odot I)\|_2^2$$

is the ELT cost and can be applied to any training image, regardless of whether or not the training image is labeled with landmarks. The ELT cost only trains the first part of the sequential multi-tasking system 285 (the neural network model 265 for landmark localization). The third part of the cost $$\frac{\lambda}{SK} \sum_{L} \sum_{k=1}^{K} \|\tilde{L}_k - L_k(I)\|_2^2 + \gamma \|\mathbb{W}\|_2^2$$

is the squared Euclidean distance between GT coordinates of each landmark and estimated landmark locations and is used only when landmark labels are provided. The third part of the cost only affects the neural network model 265. The last cost is $l_2$-norm on the parameters of the neural network model 265.

High accuracy may be achieved for landmark estimation without requiring a large training dataset with landmark labels. Instead, a sequential multi-tasking neural network system may be trained for landmark estimation and attribute classification and/or the equivariant landmark transformation (ELT) technique may be used to train a neural network model for landmark estimation. When a sequential multi-tasking neural network system is used, landmark estimation may be improved using auxiliary attributes such as class labels by back-propagating errors through the landmark localization components of a multi-tasking neural network system. The sequential multi-tasking neural network system may be trained in a supervised and/or semi-supervised manner, reducing the requirement to have a large training dataset with landmark labels. When the ELT technique is used, the neural network model for landmark estimation may be training in a supervised and/or unsupervised manner, also reducing the requirement to have a large training dataset with landmark labels. When ELT is used, transformed landmarks generated by the neural network model are effectively used in place of ground truth landmarks.

Parallel Processing Architecture

Figure 3:
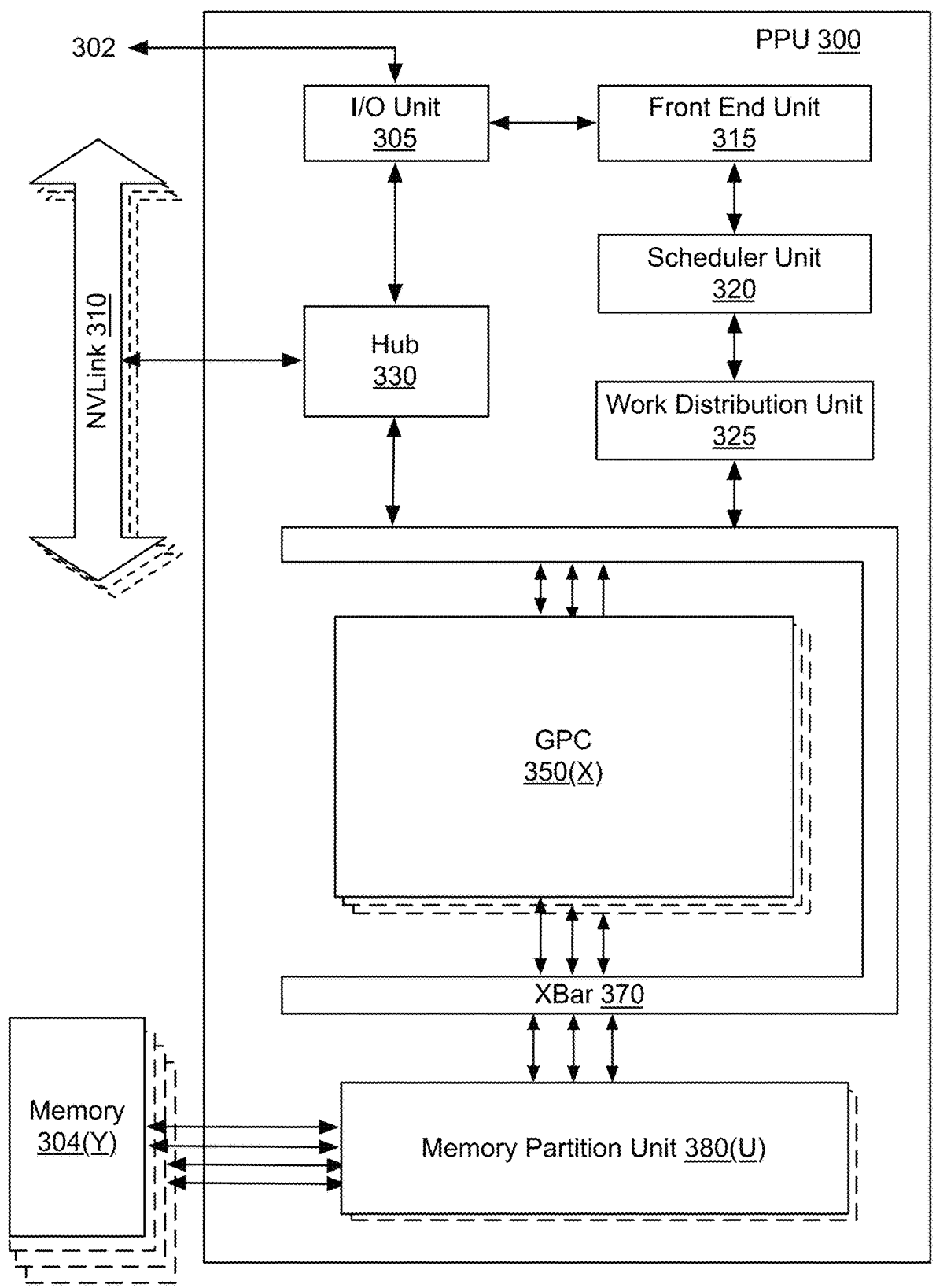
FIG. 3 illustrates a parallel processing unit, in accordance with one embodiment.

FIG. 3 illustrates a parallel processing unit (PPU) 300, in accordance with one embodiment. In one embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In one embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like. In particular, the PPU 300 may be configured to implement one or more of the neural network system 100, the sequential multi-tasking neural network system 135, the multi-tasking neural network system 200, the sequential multi-tasking neural network system 225, the sequential multi-tasking neural network system 235, and the sequential multi-tasking neural network system 285.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In one embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (i.e., commands, data, etc.) from a host processor (not shown) over the interconnect 302. The I/O unit 305 may communicate with the host processor directly via the interconnect 302 or through one or more intermediate devices such as a memory bridge. In one embodiment, the I/O unit 305 may communicate with one or more other processors, such as one or more the PPUs 300 via the interconnect 302. In one embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In one embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In one embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the I/O unit 305 may be configured to access the buffer in a system memory connected to the interconnect 302 via memory requests transmitted over the interconnect 302. In one embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In one embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In one embodiment, the PPU 300 includes a number U of partition units 380 that is equal to the number of separate and distinct memory devices 304 coupled to the PPU 300. A partition unit 380 will be described in more detail below in conjunction with FIG. 4B.

In one embodiment, a host processor executes a driver kernel that implements an application programming interface (API) that enables one or more applications executing on the host processor to schedule operations for execution on the PPU 300. In one embodiment, multiple compute applications are simultaneously executed by the PPU 300 and the PPU 300 provides isolation, quality of service (QoS), and independent address spaces for the multiple compute applications. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In one embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
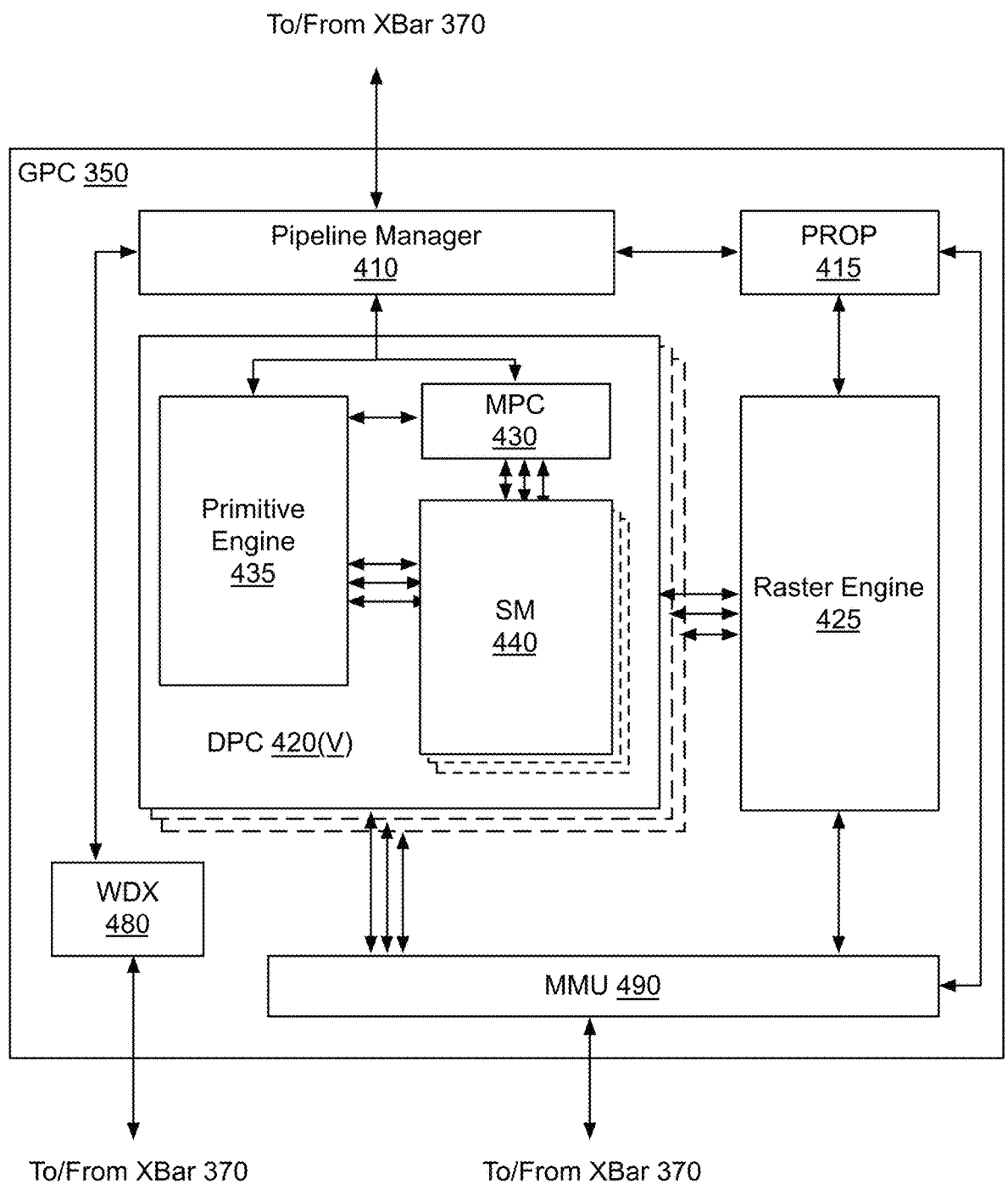
FIG. 4A illustrates a general processing cluster within the parallel processing unit of FIG. 3, in accordance with one embodiment.

FIG. 4A illustrates a GPC 350 of the PPU 300 of FIG. 3, in accordance with one embodiment. As shown in FIG. 4A, each GPC 350 includes a number of hardware units for processing tasks. In one embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In one embodiment, the operation of the GPC 350 is controlled by the pipeline manager 410. The pipeline manager 410 manages the configuration of the one or more DPCs 420 for processing tasks allocated to the GPC 350. In one embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In one embodiment, the pipeline manager 410 may configure at least one of the one or more DPCs 420 to implement a neural network model and/or a computing pipeline.

Figure 4B:
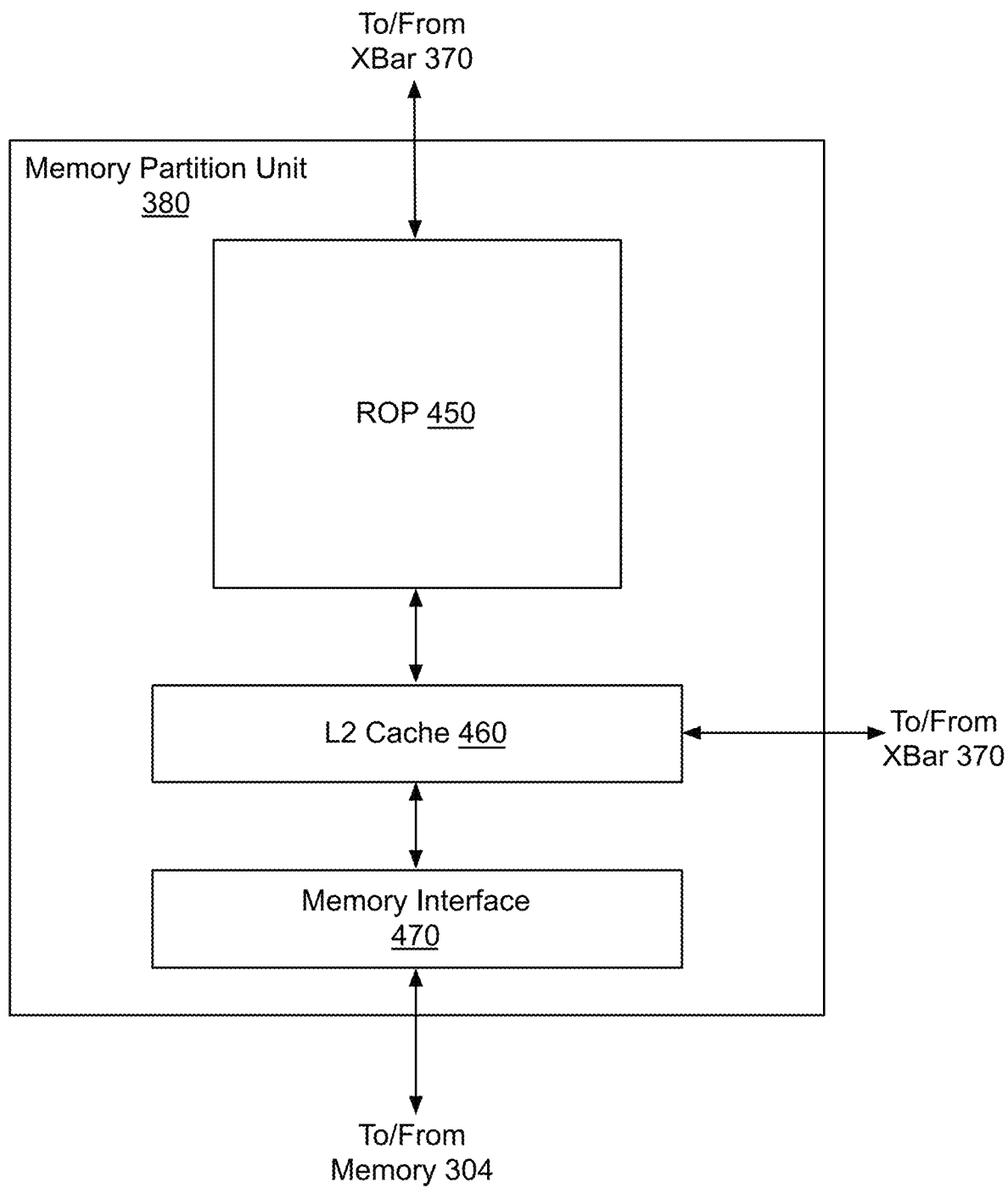
FIG. 4B illustrates a memory partition unit of the parallel processing unit of FIG. 3, in accordance with one embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In one embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In one embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In one embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In one embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with one embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In one embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In one embodiment, the memory interface 470 implements an HBM2 memory interface and Y equals half U. In one embodiment, the HBM2 memory stacks are located on the same physical package as the PPU 300, providing substantial power and area savings compared with conventional GDDR5 SDRAM systems. In one embodiment, each HBM2 stack includes four memory dies and Y equals 4, with HBM2 stack including two 128-bit channels per die for a total of 8 channels and a data bus width of 1024 bits.

In one embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In one embodiment, the PPU 300 implements a multi-level memory hierarchy. In one embodiment, the memory partition unit 380 supports a unified memory to provide a single unified virtual address space for CPU and PPU 300 memory, enabling data sharing between virtual memory systems. In one embodiment the frequency of accesses by a PPU 300 to memory located on other processors is traced to ensure that memory pages are moved to the physical memory of the PPU 300 that is accessing the pages more frequently. In one embodiment, the NVLink 310 supports address translation services allowing the PPU 300 to directly access a CPU's page tables and providing full access to CPU memory by the PPU 300.

In one embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
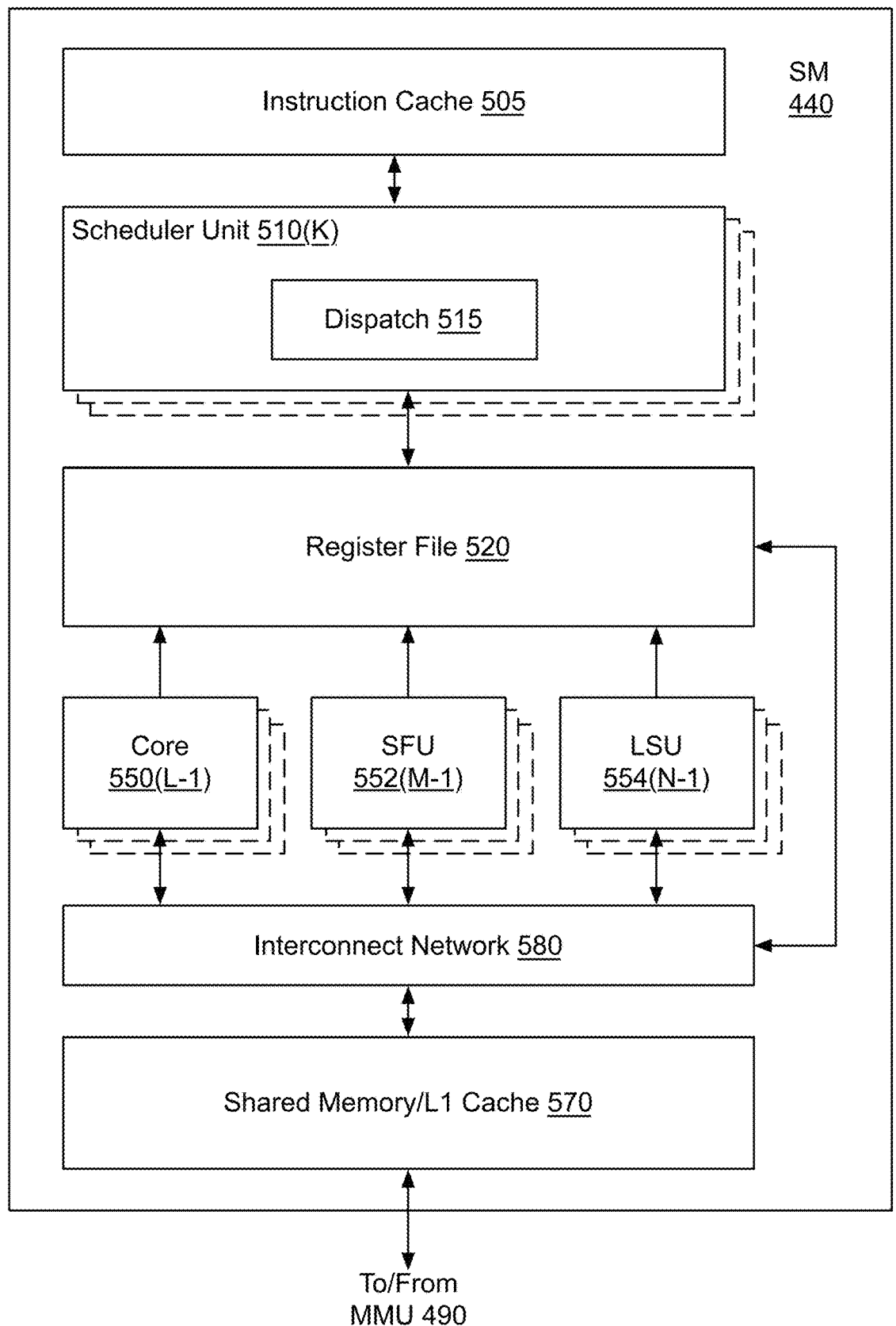
FIG. 5A illustrates the streaming multi-processor of FIG. 4A, in accordance with one embodiment.

FIG. 5A illustrates the streaming multi-processor 440 of FIG. 4A, in accordance with one embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In one embodiment, each warp executes 32 threads. The scheduler unit 510 may manage a plurality of different thread blocks, allocating the warps to the different thread blocks and then dispatching instructions from the plurality of different cooperative groups to the various functional units (i.e., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In one embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In one embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In one embodiment, the floating point arithmetic logic units implement the IEEE 754-2008 standard for floating point arithmetic. In one embodiment, the cores 550 include 64 single-precision (32-bit) floating point cores, 64 integer cores, 32 double-precision (64-bit) floating point cores, and 8 tensor cores.

Tensor cores configured to perform matrix operations, and, in one embodiment, one or more tensor cores are included in the cores 550. In particular, the tensor cores are configured to perform deep learning matrix arithmetic, such as convolution operations for neural network training and inferencing. In one embodiment, each tensor core operates on a 4×4 matrix and performs a matrix multiply and accumulate operation D=A×B+C, where A, B, C, and D are 4×4 matrices.

In one embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In one embodiment, the SFUs 552 may include a tree traversal unit configured to traverse a hierarchical tree data structure. In one embodiment, the SFUs 552 may include texture unit configured to perform texture map filtering operations. In one embodiment, the texture units are configured to load texture maps (e.g., a 2D array of texels) from the memory 304 and sample the texture maps to produce sampled texture values for use in shader programs executed by the SM 440. In one embodiment, the texture maps are stored in the shared memory/L1 cache 470. The texture units implement texture operations such as filtering operations using mip-maps (i.e., texture maps of varying levels of detail). In one embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In one embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In one embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In one embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In one embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
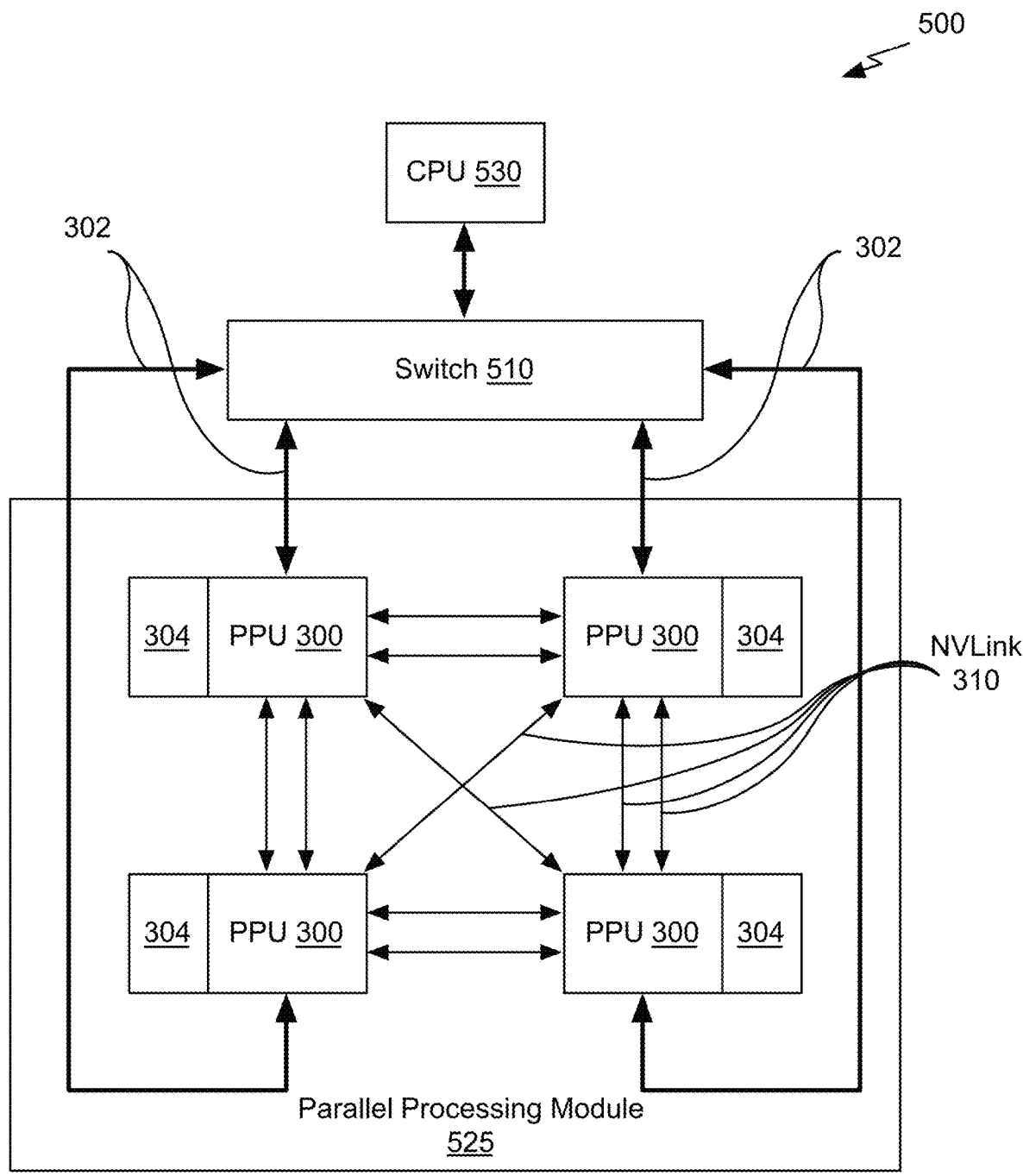
FIG. 5B is a conceptual diagram of a processing system implemented using the PPU of FIG. 3, in accordance with one embodiment.

FIG. 5B is a conceptual diagram of a processing system 500 implemented using the PPU 300 of FIG. 3, in accordance with one embodiment. The exemplary system 500 may be configured to implement the system 100 shown in FIG. 1A and/or perform the method 125 shown in FIG. 1B. The exemplary system 500 may be configured to implement the sequential multi-tasking neural network system 135 shown in FIG. 1C or 1D and/or perform the method 140 shown in FIG. 1E or the method 150 shown in FIG. 1F. The exemplary system 500 may be configured to implement the multi-tasking neural network system 200 shown in FIG. 2A. The exemplary system 500 may be configured to implement the sequential multi-tasking neural network system 225 shown in FIG. 2B and/or perform the method 245 shown in FIG. 2C. The exemplary system 500 may be configured to implement the sequential multi-tasking neural network system 235 shown in FIG. 2D and/or perform the method 242 shown in FIG. 2E. The exemplary system 500 may be configured to implement the sequential multi-tasking neural network system 285 shown in FIG. 2F.

The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In one embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In one embodiment, the CPU 530, switch 510, and the parallel processing module 525 are situated on a single semiconductor platform.

In one embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In one embodiment, the NVLink 310 allows direct load/store/atomic access from the CPU 530 to each PPU's 300 memory 304. In one embodiment, the NVLink 310 supports coherency operations, allowing data read from the memories 304 to be stored in the cache hierarchy of the CPU 530, reducing cache access latency for the CPU 530. In one embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
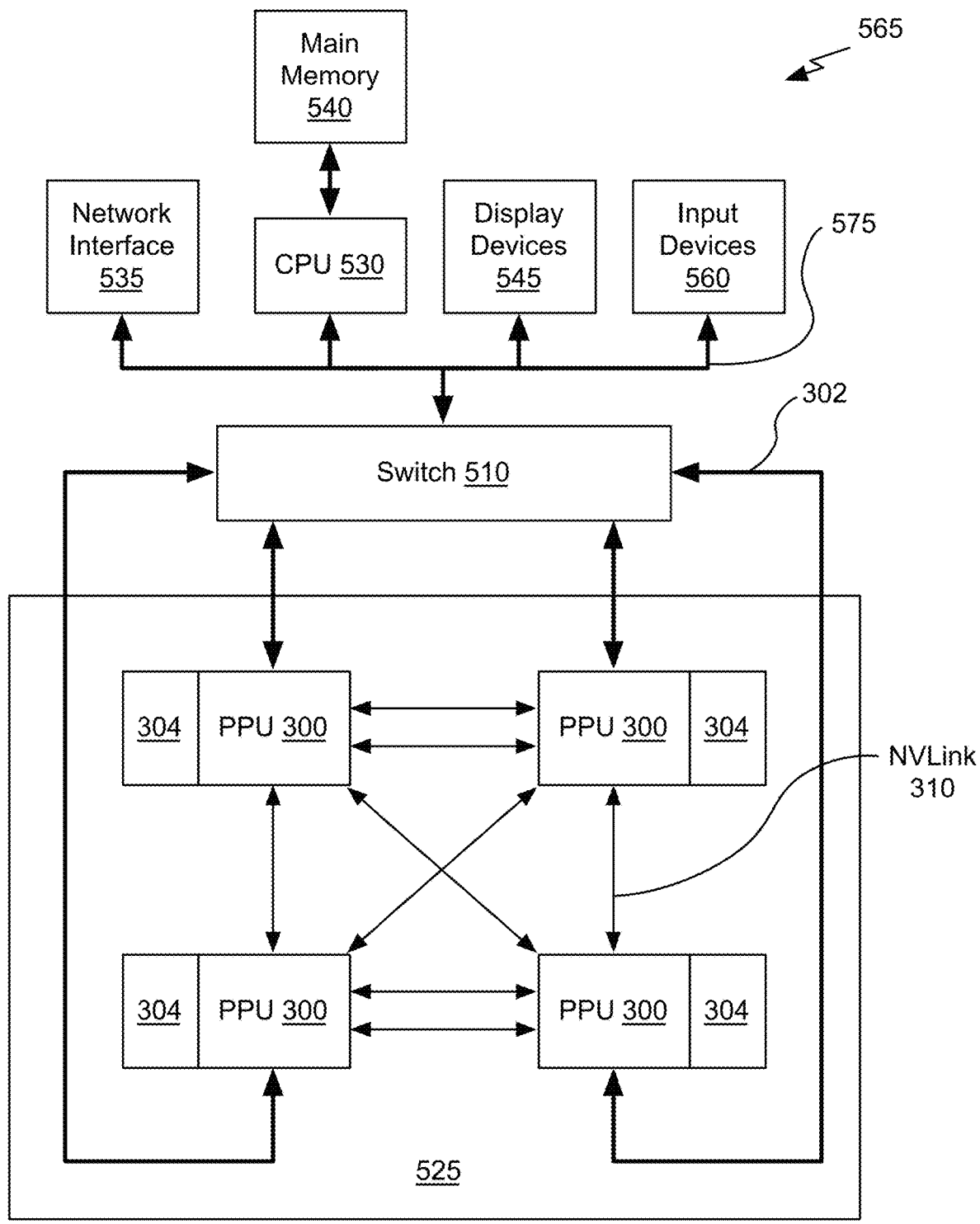
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the system 100 shown in FIG. 1A and/or perform the method 125 shown in FIG. 1B. The exemplary system 565 may be configured to implement the sequential multi-tasking neural network system 135 shown in FIG. 1C or 1D and/or perform the method 140 shown in FIG. 1E or the method 150 shown in FIG. 1F. The exemplary system 565 may be configured to implement the multi-tasking neural network system 200 shown in FIG. 2A. The exemplary system 565 may be configured to implement the sequential multi-tasking neural network system 225 shown in FIG. 2B and/or perform the method 245 shown in FIG. 2C. The exemplary system 565 may be configured to implement the sequential multi-tasking neural network system 235 shown in FIG. 2D and/or perform the method 242 shown in FIG. 2E. The exemplary system 565 may be configured to implement the sequential multi-tasking neural network system 285 shown in FIG. 2F.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, i.e. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects. For example, a neural learning system is trained for landmark localization and/or attribute classification.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
applying a transform to input image data to produce transformed input image data;
applying the transform to predicted coordinates for landmarks of the input image data to produce transformed predicted coordinates;
processing, by a neural network model, the transformed input image data to generate additional landmarks of the transformed input image data and additional predicted coordinates for each one of the additional landmarks;
updating parameters of the neural network model to produce a trained neural network model by reducing differences between the transformed predicted coordinates and the additional predicted coordinates; and
providing the trained neural network model for use in identifying landmark locations within unlabeled images.

2. The method of claim 1, further comprising:
processing, by the neural network model, the input image data to generate pixel-level likelihood estimates for landmarks in the input image data; and
computing, by a soft-argmax function, the predicted coordinates of each landmark based on the pixel-level feature maps.

3. The method of claim 1, further comprising:
processing, by the neural network model, the transformed input image data to generate pixel-level likelihood estimates for the additional landmarks; and
computing, by a soft-argmax function, the additional predicted coordinates based on the pixel-level likelihood estimates.

4. The method of claim 1, further comprising updating parameters of the neural network model to reduce differences between the predicted coordinates and ground truth coordinates corresponding ground truth landmarks in the input image data.

5. The method of claim 1, wherein the neural network model comprises at least one convolutional layer.

6. The method of claim 1, wherein the transform is an affine transform.

7. A system, comprising:
a memory storing input image data; and
a processor coupled to the memory and configured to:
apply a transform to input image data to produce transformed input image data;
apply the transform to predicted coordinates for landmarks of the input image data to produce transformed predicted coordinates;
implement a neural network model for processing the transformed input image data to generate additional landmarks of the transformed input image data and additional predicted coordinates for each one of the additional landmarks;
update parameters of the neural network model to produce a trained neural network model by reducing differences between the transformed predicted coordinates and the additional predicted coordinates; and
provide the trained neural network model for use in identifying landmark locations within unlabeled images.

8. The system of claim 7, wherein the processor is further configured to:
process, by the neural network model, the input image data to generate pixel-level likelihood estimates for landmarks in the input image data; and compute, by a soft-argmax function, the predicted coordinates of each landmark based on the pixel-level feature maps.

9. The system of claim 7, wherein the processor is further configured to:
process, by the neural network model, the transformed input image data to generate pixel-level likelihood estimates for the additional landmarks; and
compute, by a soft-argmax function, the additional predicted coordinates based on the pixel-level likelihood estimates.

10. The system of claim 7, wherein the processor is further configured to update parameters of the neural network model to reduce differences between the predicted coordinates and ground truth coordinates corresponding ground truth landmarks in the input image data.

11. The system of claim 7, wherein the neural network model comprises at least one convolutional layer.

12. The system of claim 7, wherein the transform is an affine transform.

13. A non-transitory, computer-readable storage medium storing instructions that, when executed by a processor, cause the processor to:
apply a transform to input image data to produce transformed input image data;
apply the transform to predicted coordinates for landmarks of the input image data to produce transformed predicted coordinates;
process, by a neural network model, the transformed input image data to generate additional landmarks of the transformed input image data and additional predicted coordinates for each one of the additional landmarks;
update parameters of the neural network model to produce a trained neural network model by reducing differences between the transformed predicted coordinates and the additional predicted coordinates; and
provide the trained neural network model for use in identifying landmark locations within unlabeled images.

14. The non-transitory, computer-readable storage medium of claim 13, wherein the processor is further configured to:
process, by the neural network model, the input image data to generate pixel-level likelihood estimates for landmarks in the input image data; and
compute, by a soft-argmax function, the predicted coordinates of each landmark based on the pixel-level feature maps.

15. The non-transitory, computer-readable storage medium of claim 13, wherein the processor is further configured to:
process, by the neural network model, the transformed input image data to generate pixel-level likelihood estimates for the additional landmarks; and
compute, by a soft-argmax function, the additional predicted coordinates based on the pixel-level likelihood estimates.

16. The non-transitory, computer-readable storage medium of claim 13, wherein the processor is further configured to update parameters of the neural network model to reduce differences between the predicted coordinates and ground truth coordinates corresponding ground truth landmarks in the input image data.

17. The non-transitory, computer-readable storage medium of claim 13, wherein the neural network model comprises at least one convolutional layer.

18. The non-transitory, computer-readable storage medium of claim 13, wherein the transform is an affine transform.

* * * * *